(12) United States Patent
Okuda et al.

(10) Patent No.: US 11,267,274 B2
(45) Date of Patent: Mar. 8, 2022

(54) INK JET RECORDING METHOD

(71) Applicant: Seiko Epson Corporation, Tokyo (JP)

(72) Inventors: Ippei Okuda, Shiojiri (JP); Kimitaka Kamijo, Shiojiri (JP)

(73) Assignee: Seiko Epson Corporation

( * ) Notice: Subject to any disclaimer, the term of this patent is extended or adjusted under 35 U.S.C. 154(b) by 340 days.

(21) Appl. No.: 16/585,027

(22) Filed: Sep. 27, 2019

(65) Prior Publication Data

US 2020/0101781 A1    Apr. 2, 2020

(30) Foreign Application Priority Data

Sep. 28, 2018 (JP) .............................. JP2018-184812

(51) Int. Cl.
  *B41J 2/07* (2006.01)
  *B41M 5/00* (2006.01)
  (Continued)

(52) U.S. Cl.
  CPC .......... *B41M 5/0011* (2013.01); *B41J 2/2114* (2013.01); *B41M 5/0047* (2013.01);
  (Continued)

(58) Field of Classification Search
  CPC .............. B41M 5/0011; B41M 5/0047; B41M 7/0036; B41M 5/0017; B41M 7/009;
  (Continued)

(56) References Cited

U.S. PATENT DOCUMENTS

| 9,499,710 B2* | 11/2016 | Okuda | C09D 11/54 |
| 2009/0079795 A1* | 3/2009 | Motoharu | B41J 11/002 |
|  |  |  | 347/56 |
| 2012/0113179 A1* | 5/2012 | Higuchi | B41J 11/0005 |
|  |  |  | 347/16 |

(Continued)

FOREIGN PATENT DOCUMENTS

| JP | 2013-095078 A | 5/2013 |
| JP | 2013-116623 A | 6/2013 |

(Continued)

*Primary Examiner* — Huan H Tran
(74) *Attorney, Agent, or Firm* — Harness, Dickey & Pierce, P.L.C.

(57) ABSTRACT

An ink jet recording method includes a white ink adhesion step of causing a white ink containing a white pigment to adhere to a recording medium by an ink jet method; a non-white ink adhesion step of causing a non-white ink containing a non-white coloring material to adhere to the recording medium by the ink jet method; and a drying step of drying the white ink and the non-white ink adhering to the recording medium in the white ink adhesion step and the non-white ink adhesion step by a blowing type or radiation type drying unit, in which the white ink adhesion step and the non-white ink adhesion step are performed in a state where the recording medium is supported on a support member including a suction hole sucking the recording medium, and are performed by plural times of main scanning in which a recording head discharging the white ink and a recording head discharging the non-white ink discharge each ink while moving in a main scanning direction and plural times of sub-scanning in which the recording medium moves in a sub-scanning direction intersecting the main scanning direction.

13 Claims, 6 Drawing Sheets

(51) Int. Cl.
*B41J 2/21* (2006.01)
*C09D 11/54* (2014.01)
*C09D 11/10* (2014.01)
*C09D 11/30* (2014.01)
*B41M 7/00* (2006.01)

(52) U.S. Cl.
CPC ........... *B41M 7/0036* (2013.01); *C09D 11/10* (2013.01); *C09D 11/30* (2013.01); *C09D 11/54* (2013.01)

(58) Field of Classification Search
CPC ......... C09D 11/54; C09D 11/10; C09D 11/30; C09D 11/322; C09D 11/38; C09D 11/40; B41J 2/2114; B41J 11/0085; B41J 19/147; B41J 2/2117; B41J 11/002
See application file for complete search history.

(56) References Cited

U.S. PATENT DOCUMENTS

| | | | |
|---|---|---|---|
| 2012/0236100 | A1* | 9/2012 | Toya ................... B41J 11/0085 347/104 |
| 2013/0021403 | A1* | 1/2013 | Sonehara ............. B41J 11/0015 347/16 |
| 2013/0088539 | A1 | 4/2013 | Usuda |
| 2013/0108842 | A1 | 5/2013 | Shiono et al. |
| 2015/0197654 | A1 | 7/2015 | Okuda et al. |
| 2017/0239938 | A1* | 8/2017 | Sasaki ................... B41J 2/2114 |
| 2017/0246885 | A1* | 8/2017 | Katagami ............ B41J 11/0015 |
| 2020/0101758 | A1* | 4/2020 | Okuda .................. B41J 19/147 |

FOREIGN PATENT DOCUMENTS

| | | |
|---|---|---|
| JP | 2015-147405 A | 8/2015 |
| JP | 2017-047589 A | 3/2017 |

* cited by examiner

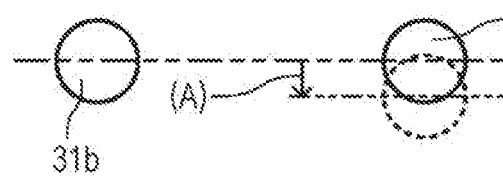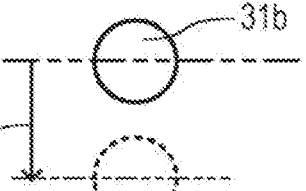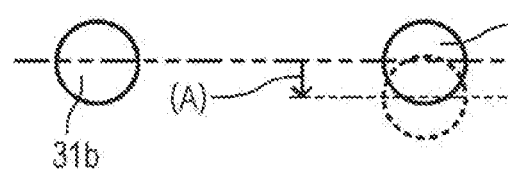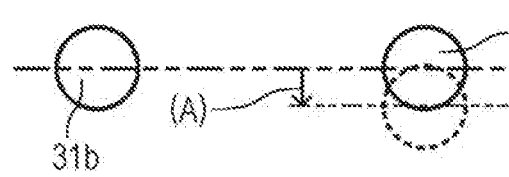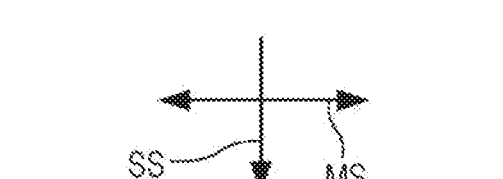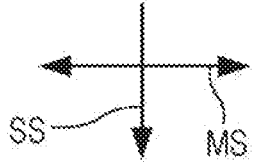

INK JET RECORDING METHOD

The present application is based on, and claims priority from, JP Application Serial Number 2018-184812, filed Sep. 28, 2018, the disclosure of which is hereby incorporated by reference herein in its entirety.

BACKGROUND

1. Technical Field

The present disclosure relates to an ink jet recording method.

2. Related Art

An ink jet recording apparatus is an apparatus in which small droplets of ink are discharged from fine nozzles and causes the droplets to adhere to a recording medium to perform recording. The ink jet recording apparatus has a feature that an image having high resolution and high quality can be recorded at a high speed. In an ink jet recording method using the ink jet recording apparatus, there are so many considerations, including stability in recording and quality of an image to be obtained. In addition, not only a study about an improvement of performance of an ink jet recording apparatus but also a study about an ink to be used are lively.

Also, as an ink jet recording method, there is a so-called overprinting method in which a plurality of liquids are stacked on and adhere to the same area of a recording medium. For example, JP-A-2015-147405 discloses a recording method including a step of adhering a reaction liquid containing an aggregating agent and an ink containing a coloring material to a non-absorbent recording target medium or a low-absorbent recording target medium by overlapping each other. JP-A-2015-147405 also discloses that the recording method uses an ink jet recording apparatus including a platen as a support of a recording target medium and performs the recording while heating the platen.

An ink jet recording apparatus may include a member configured to support a recording medium called a platen. The platen is provided at a location facing a recording head. Then, the recording head discharges an ink or the like in a state where the recording medium is disposed in a gap (platen gap) between the platen and the recording head, to perform recording. The platen may include a mechanism drawing a recording medium such that a distance between the recording medium and the recording head is hard to change. As one of the mechanism, there is a mechanism in which a suction hole is provided in the platen and a negative pressure is generated in the suction hole. The platen may also include a mechanism to heat the recording medium.

When an image is formed by overprinting of an ink by using an ink jet recording apparatus, there were cases where unevenness occurred in the image. It was found that this unevenness was likely to occur when recording was performed by using an ink jet recording apparatus including a platen having a suction hole while heating the recording medium by the platen, and was a mark of the suction hole remaining in the image. That is, it was difficult to achieve an ink jet recording method that can suppress a suction hole mark while having good image quality.

SUMMARY (1) According to an aspect of the present disclosure, an ink jet recording method includes: a white ink adhesion step of causing a white ink containing a white pigment to adhere to a recording medium by an ink jet method; a non-white ink adhesion step of causing a non-white ink containing a non-white coloring material to adhere to the recording medium by the ink jet method; and a drying step of drying the white ink and the non-white ink adhering to the recording medium in the white ink adhesion step and the non-white ink adhesion step by a blowing type or radiating type drying unit, in which the white ink adhesion step and the non-white ink adhesion step are performed in a state where the recording medium is supported on a support member including a suction hole sucking the recording medium, and are performed by plural times of main scanning in which a recording head discharging the white ink and a recording head discharging the non-white ink discharge each ink while moving in a main scanning direction and plural times of sub-scanning in which the recording medium moves in a sub-scanning direction intersecting the main scanning direction.

(2) In the method of (1), a surface temperature of the recording medium in the white ink adhesion step and the non-white ink adhesion step may be 40.0° C. or lower.

(3) In the method of (1) or (2), in the step performed first among the white ink adhesion step and the non-white ink adhesion step, the number of times of the main scanning which is performed in a state where an area of the recording medium is supported on the suction hole may be 10 or less.

(4) In the method of any of (1) to (3), the support member may include a conductive type drying unit heating the recording medium conductively, and the ink jet recording method may further include a drying step of drying the white ink and the non-white ink adhering to the recording medium in the white ink adhesion step and the non-white adhesion step, by the conductive type drying unit.

(5) In the method of any of (1) to (4), a material of the support member may be metal or plastic.

(6) In the method of any of (1) to (5), the method may further include a treatment liquid adhesion step of causing a treatment liquid containing an aggregating agent to adhere to the recording medium.

(7) In the method of (6), a thickening ratio of the ink adhering in the step performed later among the white ink adhesion step and the non-white ink adhesion step may be greater than a thickening ratio of the ink adhering in the step performed first.

(8) In the method of any of (1) to (7), the white ink adhesion step may be performed prior to the non-white ink adhesion step.

(9) In the method of any of (1) to (8), the recording head may include a first nozzle array and a second nozzle array each of which nozzles are arranged in the sub-scanning direction, the first nozzle array and the second nozzle array may be disposed to overlap each other when projected in the main scanning direction, each of the first nozzle array and the second nozzle array may have a discharge nozzle group and a non-discharge nozzle group, when the discharge nozzle group of the first nozzle array and the discharge nozzle group of the second nozzle array are projected in the main scanning direction, the discharge nozzle group of the first nozzle array may be disposed upstream of the discharge nozzle group of the second nozzle array in a transport direction of the recording medium in the sub-scanning direction, the ink adhering in the step performed first among the white ink adhesion step and the non-white ink adhesion step may be discharged from the discharge nozzle group of the first nozzle array, and the ink adhering in the step performed later among the white ink adhesion step and the non-white ink adhesion step may be discharged from the discharge nozzle group of the second nozzle array.

(10) In the method of any of (1) to (9), an adhesion amount of the white ink in the white ink adhesion step may be 5.0 mg/inch$^2$ or more.

(11) In the method of any of (1) to (10), the recording may be performed on a low-absorbent recording medium or a non-absorbent recording medium.

(12) In the method of any of (1) to (11), in the ink adhering in the step performed later among the white ink adhesion step and the non-white ink adhesion step, a content of an organic solvent of polyols, having a normal boiling point of 280.0° C. or higher may be 1.0% by mass or less relative to an ink total amount.

(13) In the method of any of (1) to (12), a white ink layer formed by the white ink adhesion step and a non-white ink layer formed by the non-white ink adhesion step may be stacked on the recording medium.

BRIEF DESCRIPTION OF THE DRAWINGS

FIGS. 8A-8D are schematic views illustrating a relationship between an example of a suction hole of the platen and a recording medium.

DESCRIPTION OF EXEMPLARY EMBODIMENTS

Figure 1:
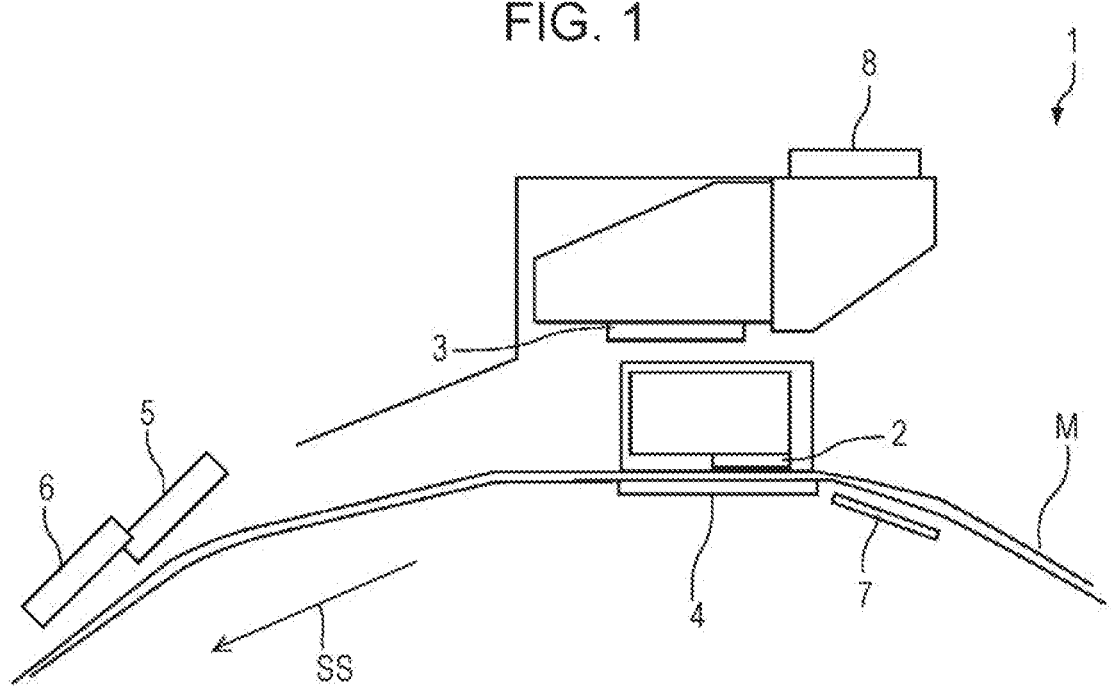
FIG. 1 is a schematic view of an example of an ink jet recording apparatus used in an ink jet recording method of an embodiment.

Hereinafter, embodiments of the present disclosure will be described. Embodiments described below illustrate an example of the present disclosure. The present disclosure is not limited to the following embodiments at all and also includes various modifications which are carried out within a range without changing the gist of the present disclosure. Not all of configurations described below are necessarily indispensable configurations to the present disclosure.

An ink jet recording method according to the present embodiment includes a white ink adhesion step of causing a white ink containing a white pigment to adhere to a recording medium by an ink jet method, a non-white ink adhesion step of causing a non-white ink containing a non-white coloring material to adhere to the recording medium by the ink jet method; and a drying step of drying the white ink and the non-white ink adhering to the recording medium in the white ink adhesion step and the non-white ink adhesion step by a blowing type or radiating type drying unit. The white ink adhesion step and the non-white ink adhesion step are performed in a state where the recording medium is supported on a support member including a suction hole sucking the recording medium, and are performed by plural times of main scanning in which a recording head discharging the white ink and a recording head discharging the non-white ink discharge each ink while moving in a main scanning direction and plural times of sub-scanning in which the recording medium moves in a sub-scanning direction intersecting the main scanning direction.

1. White Ink Adhesion Step

The white ink adhesion step is a step of causing the white ink to adhere to the recording medium by discharging the white ink from the recording head by the ink jet method. Hereinafter, the white ink will be described, and the recording medium, the recording head, the ink jet recording apparatus, and the like will be described later.

1.1. White Ink

The white ink contains a white pigment.

1.1.1. White Pigment

Examples of the white pigment contained in the white ink include a metal compound such as metal oxide, barium sulfate, and calcium carbonate. Examples of the metal oxide include titanium dioxide, zinc oxide, silica, alumina, and magnesium oxide. In addition, in the white pigment, particles having a hollow structure may be used. As the particles having a hollow structure, known particles can be used. A material of the white pigment is preferably different from inorganic fine particles to be described later.

As the white pigment, among the examples described above, from a viewpoint of favorable whiteness and scratch resistance, it is preferable to use the titanium dioxide. One kind of the white pigment may be used alone and two or more kinds thereof may be used in combination.

A volume-based average particle diameter (D50) (also referred to as "volume average particle diameter") of the white pigment is set to be larger than a volume-average particle diameter of the inorganic fine particles to be described later. The volume average particle diameter of the white pigment is preferably from 30.0 nm to 600.0 nm, more preferably from 100.0 nm to 500.0 nm, and still more preferably from 150.0 nm to 400.0 nm. When the volume average particle diameter of the white pigment is within the range, the particles are difficult to settle and the dispersion stability can be improved. Also, when the white pigment is applied to an ink jet recording apparatus, it is possible to make clogging or the like of a nozzle difficult to occur. In addition, when the volume average particle diameter of the white pigment is within the range, a color density such as whiteness can be sufficiently satisfied.

The volume average particle diameter of the white pigment can be measured by a particle size distribution measuring apparatus based on a laser diffraction scattering method. Examples of the particle size distribution measuring apparatus include a particle size distribution analyzer (such as "Microtrac UPA" manufactured by Nikkiso Co., Ltd.) based on a dynamic light scattering method.

In the present specification, the term "white" when referring to the white ink, the white pigment, and the like does not refer to only perfect white, and includes a chromatic color, an achromatic color, or a glossy color, as long as the color can be visually recognized as white. In addition, examples of the white ink include those named and sold under the name suggests that the ink is a white ink. More quantitatively, the "white" includes not only a color at L*=100 in CIELAB, but also colors at L*=from 80 to 100, and a* and b*=±10 or less. More specifically, when a sufficient adhesion amount of a color ink is caused to adhere to a clear recording medium and the adhesion region is measured in a reflection mode with a colorimeter based on the CIELAB, a value is in the range. An ink, of which the sufficient adhesion amount is, for example, 15 mg/cm$^2$, is regarded as the white ink. In addition, a colorant that makes an ink the white ink is regarded as a white pigment.

A content (solid content) of the white pigment in the white ink is preferably from 0.5% by mass to 20% by mass, preferably from 1% by mass to 20% by mass, more preferably from 5% by mass to 15% by mass, and still more preferably 7% by mass to 15% by mass, relative to total mass of the white ink. When the content of the white pigment is within the range, clogging or the like of a nozzle of the ink jet recording apparatus hardly occurs and a color density such as whiteness can be sufficiently satisfied.

It is preferable that the white pigment can be stably dispersed in water. Therefore, the white pigment may be dispersed by using a dispersing agent. As the dispersant, any of a surfactant, a resin dispersant, and the like may be used, and is selected from those which can make dispersion stability of the white pigment in the white ink containing the white pigment favorable. In addition, the white pigment may be used as a self-dispersible pigment by, for example, oxidizing or sulfonating a surface of the pigment with ozone, hypochlorous acid, fuming sulfuric acid, or the like to modify the surface of the pigment particle.

Examples of a resin dispersant can include (meth)acrylic resin such as poly(meth)acrylic acid, a (meth)acrylic acid-acrylonitrile copolymer, a (meth)acrylic acid-(meth)acrylic acid ester copolymer, a vinyl acetate-(meth)acrylic acid ester copolymer, a vinyl acetate-(meth)acrylic acid copolymer, and a vinyl naphthalene-(meth)acrylic acid copolymer, and salts thereof; styrene resin such as a styrene-(meth)acrylic acid copolymer, a styrene-(meth)acrylic acid-(meth)acrylic acid ester copolymer, a styrene-α-methylstyrene-(meth) acrylic acid copolymer, a styrene-α-methylstyrene-(meth) acrylic acid-(meth)acrylic acid ester copolymer, a styrene-maleic acid copolymer, and a styrene-maleic anhydride copolymer, and salts thereof; an urethane resin, which is a polymer compound (resin) having an urethane bond in which an isocyanate group and a hydroxyl group are reacted and may be linear and/or branched regardless of a cross-linked structure, and salts thereof; polyvinyl alcohols; a vinylnaphthalene-maleic acid copolymer and salts thereof; a vinyl acetate-maleic acid ester copolymer and salts thereof; and aqueous resin such as a vinyl acetate-crotonic acid copolymer and salts thereof. Among these, a copolymer of a monomer having a hydrophobic functional group and a monomer having a hydrophilic functional group, and a polymer formed of monomers having both a hydrophobic functional group and a hydrophilic functional group are preferable. As a form of a copolymer, any form of a random copolymer, a block copolymer, an alternating copolymer, and a graft copolymer can be used.

Examples of a commercial product of the styrene resin dispersant include X-200, X-1, X-205, X-220, and X-228 (which are manufactured by SEIKO PMC CORPORATION), Nopcosperse (registered trademark) 6100 and 6110 (which are manufactured by SAN NOPCO LIMITED), Joncryl 67, 586, 611, 678, 680, 682, and 819 (which are manufactured by BASF Corporation), DISPER BYK-190 (manufactured by BYK Japan KK.), and N-EA137, N-EA157, N-EA167, N-EA177, N-EA197D, N-EA207D, and E-EN10 (which are manufactured by DKS Co. Ltd).

Examples of a commercially available product of the acrylic resin dispersant include BYK-187, BYK-190, BYK-191, BYK-194N, and BYK-199 (which are manufactured by BYK), and ARON A-210, A6114, AS-1100, AS-1800, A-30SL, A-7250, and CL-2 (which are manufactured by TOAGOSEI Co., Ltd.).

Furthermore, examples of a commercial product of the urethane resin dispersant include BYK-182, BYK-183, BYK-184, and BYK-185 (which are manufactured by BYK), TECO Disperse 710 (manufactured by Evonic Tego chemie GmbH), and Borchi (registered trademark) Gen 1350 (manufactured by 0MG Borchers GmbH).

One kind of the dispersant may be used alone and two or more kinds thereof may be used in combination. A total content of the dispersant is from 0.1 parts by mass to 30 parts by mass, preferably from 0.5 parts by mass to 25 parts by mass, more preferably from 1 part by mass to 20 parts by mass, and still more preferably 1.5 parts by mass to 15 parts by mass, relative to 50 parts by mass of the white pigment. When the content of the dispersant is 0.1 parts by mass or more relative to 50 parts by mass of the white pigment, it is possible to further enhance the dispersion stability of the white pigment. In addition, when the content of the dispersant is 30 parts by mass or less relative to 50 parts by mass of the white pigment, it is possible to suppress viscosity of a dispersion to be obtained to be low.

Among the dispersants exemplified, the resin dispersants are preferable. In particular, at least one selected from the acrylic resin, the styrene resin, and the urethane resin is more preferable. Also, in this case, it is still more preferable that a weight average molecular weight of the dispersant is 500 or more. When using the resin dispersant as the dispersant, it is possible to make the dispersion stability of the white pigment still more favorable.

In addition, the white pigment itself may or may not have a property of being aggregated by the aggregating agent in a treatment liquid to be described later. However, since the property depends also on the dispersant, the white pigment may be appropriately selected according to aggregation property required.

1.1.2. Other Components

The white ink may further contain a component such as resin particles, a water soluble organic solvent, a surfactant, water, wax, inorganic fine particles, an additive, a resin dispersant, preservative.fungicide, a rust inhibitor, a chelating agent, a viscosity modifier, an antioxidant, and an anti-mold agent, in addition to the white pigment.

1.1.2.1. Resin Particles

The white ink may contain resin particles. The resin particles can further improve adhesion of the image by the white ink adhering to the recording medium. In addition, when the resin particles are difficult to be aggregated due to the treatment liquid, the resin particles can be more uniformly distributed in the adhesion area on the recording medium and it is possible to make unevenness of the image due to the white ink small.

Examples of the resin particles include resin particles including urethane resin, acrylic resin, fluorene resin, polyolefin resin, rosin modified resin, terpene resin, polyester resin, polyamide resin, epoxy resin, vinyl chloride resin, a vinyl chloride-vinyl acetate copolymer, ethylene vinyl acetate resin, and the like. These resin particles are often handled in a form of an emulsion, and may be in a form of powder. In addition, one kind of the resin particles can be used alone and two or more kinds thereof can be used in combination.

The urethane resin is a generic term for resin having a urethane bond. As the urethane resin, polyether urethane resin having an ether bond in a main chain, a polyester urethane resin having an ester bond in a main chain, a polycarbonate urethane resin having a carbonate bond in a main chain, and the like may be used in addition to the urethane bond. As the urethane resin, a commercially available product may be used. For example, the urethane resin may be used by being selected from commercially available products such as SUPERFLEX 460, 460s, 840, E-4000 (trade name, manufactured by DKS Co., Ltd.), RESAMINE D-1060, D-2020, D-4080, D-4200, D-6300, D-6455 (trade name, manufactured by Dainichiseika Color & Chemicals Mfg. Co., Ltd.), TAKELAC WS-6021, W-512-A-6 (trade name, manufactured by Mitsui Chemicals & SKC Polyurethanes Inc.), Sancure 2710 (trade name, manufactured by LUBRIZOL Corporation), and PERMARIN UA-150 (trade name, manufactured by Sanyo Chemical Industries, Ltd.).

The acrylic resin is a generic term for a polymer obtained by polymerizing at least an acrylic monomer such as (meth) acrylic acid and (meth)acrylic acid ester, as one component. Examples thereof include resin obtained from acrylic monomers or a copolymer of an acrylic monomer and another monomer other than the acrylic monomer. Examples thereof include acryl-vinyl resin which is a copolymer of an acrylic monomer and a vinyl monomer. Furthermore, examples thereof include a copolymer with a vinyl monomer such as styrene.

As the acrylic monomer, acrylamide, acrylonitrile, and the like can also be used. As a resin emulsion using the acrylic resin as a raw material, a commercially available product may be used. For example, the resin emulsion may be used by being selected from FK-854 (trade name, manufactured by CHIRIKA. Co., ltd.), Movinyl 952B and 718A (trade name, manufactured by Nippon Synthetic Chemical Industry Co., Ltd.), Nipol LX852 and LX874 (trade name, manufactured by Zeon Corporation), and the like.

In the present specification as described above, the acrylic resin may be styrene acrylic resin. In addition, in the present specification, an expression "(meth)acrylic" refers to at least one of acrylic and methacrylic.

The styrene acrylic resin is a copolymer obtained from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer. For the styrene acrylic resin, a commercially available product may be used. For example, the styrene acrylic resin may be used by being selected from Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (all trade names, manufactured by BASF Corporation), Movinyl 966A and 975N (trade names, manufactured by Nippon Synthetic Chemical Industry Co., Ltd.), and VINYBLAN 2586 (manufactured by Nisshin Chemical Industry Co., Ltd.)

The polyolefin resin has an olefin such as ethylene, propylene, or butylene in a structural skeleton, and a known polyolefin resin can be appropriately selected and used. As the olefin resin, a commercially available product can be used. For example, the olefin resin can be used by being selected from ARROWBASE CB-1200 and CD-1200 (trade names, manufactured by UNITICA LTD.).

In addition, the resin particles may be supplied in a form of an emulsion. Examples of a commercially available product of this resin emulsion include Microgel E-1002 and E-5002 (trade names, manufactured by NIPPONPAINT Co., Ltd., styrene-acryl resin emulsion), VONCOAT 4001 (trade name, manufactured by DIC Corporation, acrylic resin emulsion), VONCOAT 5454 (trade name, manufactured by DIC corporation, styrene-acrylic resin emulsion), Polysol AM-710, AM-920, AM-2300, AP-4735, AT-860, and PSASE-4210E (acrylic resin emulsion), Polysol AP-7020 (styrene acrylic resin emulsion), Polysol SH-502 (vinyl acetate resin emulsion), Polysol AD-13, AD-2, AD-10, AD-96, AD-17, and AD-70 (ethylene.vinyl acetate resin emulsion), Polysol PSASE-6010 (trade name, ethylene vinyl acetate resin emulsion, and all trade names, manufactured by Showa Denko KK), Polysol SAE 1014 (trade name, styrene-acrylic resin emulsion, manufactured by Nippon Zeon Co., Ltd.), Saibinol SK-200 (trade name, acrylic resin emulsion, manufactured by Saiden Chemical Industry Co., Ltd.), AE-120A (trade name, manufactured by JSR Corporation, acrylic resin emulsion), AE 373D (trade name, manufactured by Etec Corporation, carboxy modified styrene acrylic resin emulsion), Seikadyne 1900 W (trade name, manufactured by Dainichiseika Color & Chemicals Mfg. Co., Ltd. ethylene vinyl acetate resin emulsion, VINYBLAN 2682 (acrylic resin emulsion), VINYBLAN 2886 (vinyl acetate acrylic resin emulsion), VINYBLAN 5202 (acetic acid acrylic resin emulsion) (trade names, which are manufactured by Nisshin Chemical Industry Co., Ltd.), Elitel KA-5071S, KT-8803, KT-9204, KT-8701, KT-8904, and KT-0507 (trade name, manufactured by Unitika Ltd., polyester resin emulsion), Hi-Tech SN-2002 (trade name, manufactured by TOHO CHEMICAL INDUSTRY Co., Ltd., polyester resin emulsion), TAKELAK W-6020, W-635, W-6061, W-605, W-635, and W-6021 (trade name, manufactured by Mitsui Chemicals & SKC Polyurethanes Inc., urethane resin emulsion), SUPERFLEX 870, 800, 150, 420, 460, 470, 610, and 700 (trade name, manufactured by DKS Co., Ltd., urethane resin emulsion), PERMARIN UA-150 (manufactured by Sanyo Chemical Industries, Ltd., urethane resin emulsion), Sancure 2710 (manufactured by Japanese Lubrizol Corporation, urethane resin emulsion), NeoRez R-9660, R-9637, and R-940 (manufactured by Kusumoto Chemicals, Ltd., urethane resin emulsion), ADEKA BONTIGHTER HUX-380 and 290K (manufactured by ADEKA Corporation, urethane resin emulsion), Movinyl 966A and Movinyl 7320 (manufactured by Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF Corporation), NK binder R-5HN (manufactured by Shin-Nakamura Chemical Co., Ltd), HYDRAN WLS-210 (non-crosslinkable polyurethane: manufactured by DIC Corporation), and Joncryl 7610 (manufactured by BASF Corporation). Any of these may be selected and used.

A glass transition temperature (Tg) of the resin particles is preferably from −50° C. to 200° C., more preferably from 0° C. to 150° C., and still more preferably from 50° C. to 100° C. When the glass transition temperature (Tg) of the resin particles is within the range, more excellent durability and clogging resistance tend to be obtained. The glass transition temperature is measured, for example, using a differential scanning calorimeter "DSC7000" (manufactured by Hitachi High-Tech Science Corporation.) in accordance with JIS K7121 (Testing Methods for Transition Temperatures of Plastics).

In addition, the Tg of the resin particles can be controlled by adjusting the type or the composition ratio of the monomers, focusing on an individual Tg of each monomer to be used at the time of resin polymerization. Accordingly, a Tg of the whole resin of the resin particles can be adjusted. In addition, it is also possible to mainly adjust an acid value of the resin by adjusting the type or the composition ratio of the monomers. Accordingly, it is possible to adjust reactivity between the resin particles and the treatment liquid. Then, the aggregation property of the white ink is adjusted in consideration of aggregation property of each substance such as resin particles, the white pigment, and the pigment dispersant or the aggregation property correlating with each other.

A volume average particle diameter of the resin particles is preferably from 10 nm to 300 nm, more preferably from 30 nm to 300 nm, still more preferably from 30 nm to 250 nm, and particularly preferably from 40 nm to 220 nm.

When the white ink contains the resin particles, a content thereof is from 0.1% by mass to 20% by mass, preferably from 1% by mass to 15% by mass, and more preferably from 2% by mass to 10% by mass, relative to total mass of the white ink, in terms of solid content.

1.1.2.2. Water Soluble Organic Solvent

The white ink used in the ink jet recording method according to the present embodiment may contain the water soluble organic solvent. One of functions of the water soluble organic solvent is to improve wettability of the white ink to the recording medium or enhance moisture retention of the white ink. Examples of the water soluble organic solvent include esters, alkylene glycol ethers, cyclic esters, a nitrogen-containing solvent, and a polyhydric alcohol. Examples of the nitrogen-containing solvent can include cyclic amides and non-cyclic amides. Examples of the non-cyclic amides include alkoxyalkylamides.

Examples of the esters include glycol monoacetates such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of the alkylene glycol ethers may include monoether or diether of alkylene glycol, and preferably include alkyl ether. Specific examples thereof include alkylene glycol monoalkyl ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether and alkylene glycol dialkyl ethers such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

In addition, in the alkylene glycol, diether is more preferable than the monoether in that the diether tends to dissolve or swell the resin particles in the ink more easily than the monoether and diether improves scratch resistance of an image to be formed.

Examples of the cyclic esters can include cyclic esters (lactones) such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone, and a compounds in which a hydrogen of a methylene group adjacent to a carbonyl group thereof is substituted with an alkyl group having 1 to 4 carbon atoms.

Examples of the alkoxyalkylamides can include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amides include lactams, for example, pyrrolidones such as 2-pyrrolidone, 1-methyl-2-pyrrolidone, 1-ethyl-2-pyrrolidone, 1-propyl-2-pyrrolidone, and 1-butyl-2-pyrrolidone. These are preferable from a viewpoint of solubility of the aggregating agent or acceleration of film formation of the resin particles to be described later. In particular, the 2-pyrrolidone is preferable.

In addition, it is also preferable to use a compound represented by Formula (1) as the alkoxyalkylamides.

$$R^1-O-CH_2CH_2-(C=O)-NR^2R^3 \quad (1)$$

In Formula (1), $R^1$ represents an alkyl group having 1 to 4 carbon atoms, $R^2$ and $R^3$ each independently represent a methyl group or an ethyl group. The "alkyl group having 1 to 4 carbon atoms" may be a linear or branched alkyl group, and examples thereof can include a methyl group, an ethyl group, an n-propyl group, an iso-propyl group, an n-butyl group, a sec-butyl group, an iso-butyl group, and a tert-butyl group. One kind of the compound represented by Formula (1) may be used alone and two or more kinds thereof may be used by being mixed.

Examples of a function of the compound represented by Formula (1) include enhancing the surface dryness and fixability of the white ink adhering on the low-absorbent recording medium. In particular, the compound represented by Formula (1) is excellent in actions to soften and dissolve vinyl chloride resin moderately. Therefore, the compound represented by Formula (1) softens and dissolves a recording surface containing the vinyl chloride resin, and thus can cause the white ink to penetrate into an inside of the low-absorbent recording medium. In this manner, when the white ink penetrates into the low-absorbent recording medium, the white ink is firmly fixed and it becomes easy to dry a surface of the white ink. Accordingly, an image to be obtained tends to be excellent in surface dryness and fixability.

In addition, in Formula (1), $R^1$ is more preferably a methyl group having 1 carbon atom. In Formula (1), a normal boiling point of the compound in which $R^1$ is a methyl group is lower than a normal boiling point of a compound in which $R^1$ is an alkyl group having 2 to 4 carbon atoms. Therefore, when a compound in which $R^1$ is a methyl group in Formula (1) is used, the surface dryness of an adhesion region (particularly, surface dryness of an image recorded under an environment of high temperature and high humidity) can further be improved in some cases.

A content when using the compound represented by Formula (1) is not particularly limited, and is approximately from 5% by mass to 50% by mass and preferably from 8% by mass to 48% by mass, relative to total mass of the white ink. When the content of the compound represented by Formula (1) is within the above range, fixability and surface dryness of an image (particularly, surface dryness when recording was performed under an environment of high temperature and high humidity) can be further improved in some cases.

From a viewpoint that reduction of a suction hole mark, the scratch resistance, and the like are more excellent, a content of the nitrogen-containing solvent in the white ink is preferably from 1% by mass to 30% by mass, more preferably from 1% by mass to 25% by mass, still more preferably from 1% by mass to 20% by mass, further still more preferably from 5% by mass to 20% by mass, and particularly preferably from 5% by mass to 17% by mass. In addition, from the viewpoint that the reduction of the suction hole mark is more excellent, the content is more preferably 15% by mass or less. On the other hand, from the viewpoint that the scratch resistance is more excellent, the content is more preferably 15% by mass or more.

Examples of the polyhydric alcohol include 1,2-alkanediol (for example, alkanediols such as ethylene glycol, propylene glycol (alias: propane-1,2-diol), 1,2-butanediol, 1,2-pentanediol, 1,2-hexanediol, 1,2-heptanediol, and 1,2-octanediol) and polyhydric alcohols (polyols) excluding the 1,2-alkanediol (for example, diethylene glycol, dipropylene glycol, 1,3-propanediol, 1,3-butanediol (alias: 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylol propane, and glycerin).

The polyhydric alcohols can be divided into alkanediols and polyols. The alkanediols are diols of an alkane having 5 or more carbon atoms. The carbon number of the alkane is preferably 5 to 15, more preferably 6 to 10, and still more preferably 6 to 8. The 1,2-alkanediol is preferable.

The polyols are polyols of alkane having 4 or less carbon atoms or intermolecular condensates of hydroxyl groups of polyols of alkane having 4 or less carbon atoms. The carbon number of the alkane is preferably 2 or 3. The number of the hydroxyl groups in a molecule of the polyols is 2 or more, preferably 5 or less, more preferably 3 or less. When the polyols are the intermolecular condensates, the number of intermolecular condensations is 2 or more, preferably 4 or less, and more preferably 3 or less. One kind of the polyhydric alcohols can be used alone and two or more kinds thereof can be used by being mixed.

The alkanediols and polyols can mainly function as a penetrating solvent and/or a moisturizing solvent. However, the alkanediols tend to have a strong property as the penetrating solvent, and polyols tend to have a strong property as the moisturizing solvent.

When the white ink contains the water soluble organic solvent, the water soluble organic solvent may be used alone and two or more kinds thereof may be used in combination. In addition, a total content of the water soluble organic solvent is, for example, from 5% by mass to 50% by mass, preferably from 10% by mass to 45% by mass, more preferably from 15% by mass to 40% by mass, and still more preferably from 20% by mass to 30% by mass, relative to total mass of the white ink. When the content of the water soluble organic solvent is within the range, a balance between wet-spreading property and dryness is more favorable. Furthermore, it is easy to form an image with high quality.

When the white ink contains the water soluble organic solvent, it is preferable to use the organic solvent having a normal boiling point of 280° C. or lower, preferably from 160° C. to 270° C., more preferably from 180° C. to 260° C., and still more preferably from 200° C. to 250° C. In this case, it is preferable in that scratch resistance, discharge stability, or the like is more excellent.

In the white ink, a content of the organic solvent of polyols, which is a liquid under an environment at 25° C. and has a normal boiling point of 280.0° C. or higher, is preferably 5.0% by mass or less relative to the total mass of the white ink. In addition, the content is more preferably 3.0% by mass or less, still more preferably 1.0% by mass or less, and particularly preferably 0.5% by mass or less. A lower limit of the content is 0% by mass or more and the organic solvent may not be included. Accordingly, dryness of the white ink adhering to the recording medium becomes favorable, and adhesion of the white ink to the recording medium can be improved. Furthermore, in the white ink, a content of the organic solvent (not limited to polyols), which is a liquid under an environment at 25° C., has a normal boiling point of 280.0° C. or higher, is still more preferably within the range, relative to the total mass. Examples of the organic solvent having the normal boiling point of 280° C. or higher include glycerin and polyethylene glycol monomethyl ether.

From the viewpoint that the scratch resistance is more excellent, the content of the polyhydric alcohols in the white ink is preferably from 1% by mass to 27% by mass, more preferably from 2% by mass to 15% by mass, and still more preferably from 3% by mass to 13% by mass.

1.1.2.3. Surfactant

The white ink may contain the surfactant. The surfactant has a function of reducing surface tension of the white ink and improving the wettability with the recording medium. Among the surfactants, for example, an acetylene glycol based surfactant, a silicone based surfactant, and a fluorine based surfactant can be preferably used.

The acetylene glycol based surfactant is not particularly limited, and examples thereof include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, which are manufactured by Air Products and Chemicals. Inc.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all trade names, which are manufactured by Nisshin Chemical Industry Co., Ltd.), ACETYLENOL E00, E00P, E40, and E100 (all trade names, which are manufactured by Kawaken Fine Chemicals Co., Ltd.).

The silicone based surfactant is not particularly limited, and examples thereof preferably include a polysiloxane based compound. The polysiloxane based compound is not particularly limited, and examples thereof include a polyether-modified organosiloxane. Examples of a commercially available produce of the polyether-modified organosiloxane include BYK-306, BYK-307, BYK-333, BYK-341, BYK-345, BYK-346, and BYK-348 (all trade names, which are manufactured by BYK Japan KK.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

As the fluorine based surfactant, a fluorine-modified polymer is preferably used, and specific examples thereof include BYK-3440 (manufactured by BYK Japan KK.), SURFLON S-241, S-242, and S-243 (all trade names, manufactured by AGC SEIMI CHEMICAL CO., LTD.), and FTERGENT 215M (manufactured by NEOS COMPANY LIMITED).

When the white ink contains the surfactant, plural kinds thereof may be contained. When the white ink contains the surfactant, a content thereof can be from 0.1% by mass to 2% by mass, preferably from 0.4% by mass to 1.5% by mass, and more preferably from 0.5% by mass to 1.0% by mass, relative to total mass of the white ink.

1.1.2.4. Water

The white ink used in the ink jet recording method according to the present embodiment may contain water. The white ink is preferably water based white ink. The water basis is a composition containing water as one of the main solvent components. Water may be contained as a main solvent component of the white ink, and is a component that evaporates and scatters by drying. It is preferable that the water is pure water such as ion exchanged water, ultrafiltered water, reverse osmosis water, and distilled water or water obtained by removing ionic impurities as much as possible, such as ultrapure water. In addition, when using water sterilized by ultraviolet irradiation, addition of hydrogen peroxide, or the like, in a case where the ink is preserved for a long time, it is possible to prevent fungi or bacteria from being generated, which is preferable. A content of the water is preferably 45% by mass or more, more preferably from 50% by mass to 98% by mass, and still more preferably from 55% by mass to 95% by mass, relative to total amount of the white ink.

1.1.2.5. Wax

The white ink may contain wax. Since the wax has a function of imparting smoothness to an image by the white ink, peeling of the image due to the white ink can be reduced.

As a component forming the wax, one of plants animal waxes such as carnauba wax, Candelilla wax, beeswax, rice wax, and lanolin; petroleum waxes such as paraffin wax, microcrystalline wax, polyethylene wax, oxidized polyethylene wax, and petrolatum; mineral waxes such as montan wax and ozokerite; synthetic waxes such as carbon wax, Hoechst wax, polyolefin wax, and stearic acid amide; and emulsions of natural synthetic waxes or compounded waxes such as an α-olefin maleic anhydride copolymer can be used alone or plural kinds thereof can be used by being mixed. Among these, from a viewpoint of obtaining more excellent in an effect of enhancing the fixability to a soft packaging film to be described later, it is preferable to use the polyolefin wax (in particular, polyethylene wax and polypropylene wax) and the paraffin wax.

As the wax, a commercially available product can be used as it is. Examples thereof include NOPCOTE PEM-17 (trade name, manufactured by SAN NOPCO LIMITED), CHEMIPEARL W4005 (trade name, manufactured by Mitsui Chemicals, Inc.), and AQUACER 515, 539, and 593 (all trade names, and which are manufactured by BYK Japan KK.).

In addition, when the ink jet recording method includes a heating step or the like, from a viewpoint of preventing the wax from being excessively melted and a performance thereof from being lowered, it is preferable to use the wax having a melting point of the wax, which is preferably from 50.0° C. to 200.0° C., more preferably from 70.0° C. to 180.0° C., and still more preferably from 90.0° C. to 150.0° C.

The wax may be supplied in a form of an emulsion or a suspension. The content of the white wax is preferably from 0.1% by mass to 10.0% by mass, more preferably from 0.5% by mass to 5.0% by mass, and still more preferably from 0.5% by mass to 2.0% by mass, relative to total mass of the ink, in terms of solid content. When the content of the wax is within the range, the function of the wax can be favorably exhibited. When one or both of the white ink and the non-white ink to be described later contain the wax, it is possible to sufficiently obtain the function of imparting smoothness to the image.

1.1.2.6. Additives

The white ink may contain ureas, amines, saccharides, and the like, as additives. Examples of the ureas include urea, ethylene urea, tetramethyl urea, thiourea, 1,3-dimethyl-2-imidazolidinone, and betaines (such as trimethylglycine, triethylglycine, tripropylglycine, triisopropylglycine, N,N,N-trimethylalanine, N,N,N-triethylalanine, N,N,N-triisopropylalanine, N,N,N-trimethyl methyl alanine, carnitine, and acetyl carnitine).

Examples of the amines include diethanolamine, triethanolamine, and triisopropanolamine. The ureas or the amines may function as a pH adjuster.

Examples of the saccharides include glucose, mannose, fructose, ribose, xylose, arabinose, galactose, aldonic acid, glucitol (sorbitol), maltose, cellobiose, lactose, sucrose, trehalose, and maltotriose.

1.1.2.7. Others

The white ink used in the ink jet recording method according to the present embodiment may further contain a component such as inorganic fine particles such as colloidal silica, preservative.fungicide, a rust inhibitor, a chelating agent, a viscosity modifier, an antioxidant, and an anti-mold agent, as needed.

1.2. Physical Properties of White Ink and Method of Causing White Ink to Adhere to Recording Medium When the white ink is mixed with the treatment liquid to be described later, components contained therein are aggregated by an action of the aggregating agent. In addition, when the white ink is mixed with the treatment liquid to be described later, viscosity thereof increases.

Here, regarding the increase of the viscosity of the white ink when mixed with the treatment liquid, a "thickening ratio" is defined as follows. That is, the white ink and the treatment liquid used in the ink jet recording method are mixed and stirred in a mass ratio of White ink:Treatment liquid=10:1 to determine a ratio of viscosity of a mixed liquid after mixing to viscosity of the white ink before mixing, and this ratio is the thickening ratio. The viscosity is measured at 20° C. Thus, the thickening ratio is a magnification of the viscosity after mixing based on the viscosity before mixing. Although the thickening ratio depends on a composition of white ink and the treatment liquid, a value thereof is preferably approximately from 0.5 to 10.0. Depending on a composition of the ink or the treatment liquid, the thickening ratio may be less than 1.0 and the viscosity may be lowered. However, the term is referred to as the thickening ratio. A lower limit of the thickening ratio of the white ink is preferably 1.0 or more, more preferably 1.1 or more, and still more preferably 1.3 or more. Also, an upper limit of the thickening ratio of the white ink is preferably 3.0 or less, and more preferably 2.0 or less.

The thickening ratio of the white ink can be adjusted by adjusting types and contents of the white pigment and the resin (the resin dispersant and/or resin particles) and the composition of the treatment liquid. That is, the thickening ratio can be confirmed by mixing the treatment liquid to be used and the prepared white ink. Based on this, the thickening ratio of the white ink can be adjusted.

The white ink adheres to the recording medium by the ink jet method. Therefore, the viscosity of the white ink at 20° C. before being thickened is preferably from 1.5 mPa·s to 15.0 mPa·s, more preferably from 1.5 mPa·s to 7.0 mPa·s, and still more preferably from 1.5 mPa·s to 5.5 mPa·s. Since the white ink adheres to the recording medium by the ink jet method, it is easy to efficiently form a predetermined image on the recording medium.

In the white ink to be used in the ink jet recording method of the present embodiment, from the viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less. The surface tension can be measured by confirming a surface tension when a platinum plate is wetted with a composition under an environment at 25.0° C., using an automatic surface tension meter CBVP-Z (manufactured by Kyowa Interface Science Co., LTD.).

2. Non-White Ink Adhesion Step

The non-white ink adhesion step is a step of causing the non-white ink to adhere to the recording medium by discharging the non-white ink from the recording head.

2.1. Non-White Ink

The non-white ink contains a non-white coloring material.

2.1.1. Non-White Coloring Material

The non-white coloring material contained in the non-white ink refers to a coloring material other than the white pigment. Examples of the non-white coloring material include a dye and pigment. For example, it is preferable that the non-white coloring material is a coloring material having a color such as cyan, yellow, magenta, or black.

The non-white coloring material may be either the dye or the pigment, or may be a mixture thereof. However, among the dye and the pigment, it is more preferable to contain the pigment. The pigment is excellent in storage stability such as light resistance, weather resistance, and gas resistance. Furthermore, from this viewpoint, the pigment is preferably an organic pigment.

Specifically, as the pigment, an azo pigment such as an insoluble azo pigment, a condensed azo pigment, an azo lake pigment, and a chelate azo pigment, a polycyclic pigment such as a phthalocyanine pigment, a perylene or perinone pigment, an anthraquinone pigment, a quinacridone pigment, a dioxane pigment, a thioindigo pigment, an isoindolinone pigment, and a quinophthalone pigment, a dye chelate, a dyed lake pigment, a nitro pigment, a nitroso pigment, an aniline black, a daylight fluorescent pigment, carbon black, or the like is used. One kind of the pigment may be used alone and two or more kinds thereof may be used in combination. Furthermore, as the non-white coloring material, a brilliant pigment may be used.

The pigment is not particularly limited, and specific examples thereof include the followings.

Examples of a black pigment include carbon blacks such as No. 2300, No. 900, MCF88, No. 33, No. 40, No. 45, No. 52, MA7, MA8, MA100, No. 2200B, and the like (all are manufactured by Mitsubishi Chemical Corporation), Raven 5750, Raven 5250, Raven 5000, Raven 3500, Raven 1255, Raven 700, and the like (all are manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all are manufactured by CABOT JAPAN K.K.), and Color Black FW1, Color Black FW2, Color Black FW2V, Color Black FW18, Color Black FW200, Color Black S150, Color Black 5160, Color Black S170, Printex 35, Printex U, Printex V, Printex 140U, Special Black 6, Special Black 5, Special Black 4A, and Special Black 4 (all are manufactured by Degussa).

Examples of the yellow pigment include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245, or C.I. pigment violet 19, 23, 32, 33, 36, 38, 43, and 50.

Examples of the cyan pigment include C.I. pigment blue 1, 2, 3, 15, 15:1, 15:2, 15:3, 15:34, 15:4, 16, 18, 22, 25, 60, 65, and 66, and C.I. bat blue 4 and 60.

The pigments other than the magenta, the cyan, and the yellow are not particularly limited, and examples thereof include C.I. pigment green 7 and 10, C.I. pigment brown 3, 5, 25, and 26, C.I. pigment orange 1, 2, 5, 7, 13, 14, 15, 16, 24, 34, 36, 38, 40, 43, and 63.

The pearl pigment is not particularly limited, and examples thereof include pigments having pearlescent or interference gloss, such as titanium dioxide coated mica, fish scale foil, and bismuth acid chloride.

The metallic pigment is not particularly limited, and examples thereof include particles including a simple substance or an alloy of aluminum, silver, gold, platinum, nickel, chromium, tin, zinc, indium, titanium, copper, and the like.

As the dye, for example, various dyes used for normal ink jet recording, such as a direct dye, an acidic dye, an edible dye, a basic dye, a reactive dye, a dispersion dye, a construction dye, a soluble construction dye, and a reaction dispersion dye can be used.

It is preferable that the non-white coloring material can be stably dispersed or dissolved in water. Therefore, the non-white coloring material may be dispersed by using a dispersing agent. Examples of the dispersant can include the same dispersant as used to improve the dispersibility of the white pigment of the white ink.

A content of the non-white coloring material is preferably from 0.3% by mass to 20.0% by mass, more preferably from 0.5% by mass to 15.0% by mass, and particularly preferably from 0.8% by mass to 4% by mass, relative to total mass of the non-white ink. Although the non-white coloring material having high or low aggregation property, which is contained in the non-white ink can be used, from a viewpoint of obtaining more excellent resistance to bleeding, it is preferable to use the non-white coloring material having high aggregation property.

A volume average particle diameter (before mixing with the treatment liquid) of the pigment particles when employing the pigment as the non-white coloring material is preferably from 10 nm to 300 nm, more preferably from 30 nm to 250 nm, still more preferably from 50 nm to 250 nm, and particularly preferably from 70 nm to 200 nm. The volume average particle diameter of the non-white coloring material is measured as an initial state by the method of confirming the volume average particle diameter described above. When the volume average particle diameter is in the range, it is preferable in points that it is easy to obtain a desired coloring material and it is likely to make the properties of the coloring material preferable.

2.1.2. Other Components

The non-white ink may further contain a component such as resin particles, a water soluble organic solvent, a surfactant, water, wax, an additive, a resin dispersant, preservative.fungicide, a rust inhibitor, a chelating agent, a viscosity modifier, an antioxidant, and an anti-mold agent, in addition to the non-white coloring material.

These components are all the same as those of the white ink described above, a detailed description thereof will not be repeated by replacing "white ink" with "non-white ink". These components may be contained in the white ink, or the non-white ink can contain preferable content of these components independently from the white ink.

2.2. Physical Properties of Non-White Ink and Method of Causing Non-White Ink to Adhere to Recording Medium When the non-white ink is mixed with the treatment liquid to be described later, components contained therein are aggregated by an action of the aggregating agent. In addition, when the non-white ink is mixed with the treatment liquid to be described later, viscosity thereof increases.

Here, regarding the increase of the viscosity of the non-white ink when mixed with the treatment liquid, a "thickening ratio" is defined as that of the white ink described above. A lower limit of the thickening ratio of the non-white ink is preferably 1.5 or more, more preferably 2.0 or more, still more preferably 3.0 or more, and particularly preferably 4.0 or more. Also, an upper limit of the thickening ratio of the non-white ink is 10.0 or less, preferably 7.0 or less, and more preferably 5.0 or less.

The thickening ratio of the non-white ink can be adjusted by adjusting types and contents of the non-white coloring material and the resin (the resin dispersant and/or resin particles) and the composition of the treatment liquid. That is, the thickening ratio can be confirmed by mixing the treatment liquid to be used and the prepared non-white ink. Based on this, the thickening ratio of the non-white ink can be adjusted.

The non-white ink adheres to the recording medium by the ink jet method. Therefore, the viscosity of the non-white ink at 20° C. before being thickened is preferably from 1.5 mPa·s to 15.0 mPa·s, more preferably from 1.5 mPa·s to 7.0 mPa·s, and still more preferably from 1.5 mPa·s to 5.5 mPa·s. Since the non-white ink adheres to the recording medium by the ink jet method, it is easy to efficiently form a predetermined image on the recording medium.

In the non-white ink to be used in the ink jet recording method of the present embodiment, from the viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less. The surface tension is measured in the same manner as in the white ink.

3. Drying Step

The ink jet recording method of the present embodiment includes the drying step.

The ink jet recording method according to the present embodiment includes a step of drying the recording medium before the adhesion step of the treatment liquid or the ink or during the adhesion step. The drying step is performed using a unit that stops recording and leaves it in that state, a unit (blowing type) that blows normal temperature air or warm air to the recording medium, a unit (radiation type) that irradiates the recording medium with radiation (such as infrared rays) generating heat, and a combination of two or more of the units. Accordingly, it is possible to reduce the suction hole mark.

In the blowing type, an air velocity immediately above the recording medium is preferably from 0.2 m/s to 5.0 m/s, more preferably from 0.5 m/s to 4.0 m/s, and still more preferably from 0.8 m/s to 3.0 m/s. The blowing type may blow normal temperature are and may also blow warm air. Also, the blowing type may be preferably used in combination with a drying method heating the recording medium, such as the radiation type or a conductive type.

The surface temperature of the recording medium at the time of adhesion of the ink in the drying step is preferably 20° C. or higher, and more preferably 25° C. or higher. Also, the surface temperature is preferably from 27.0° C. to 45° C., more preferably from 28° C. to 43° C., still more preferably from 30° C. to 40° C., and particularly preferably from 32° C. to 38° C. The temperature is a surface temperature of a portion of the recording face of the recording medium to which the ink adheres in the adhesion step, and is the highest temperature of the recording area. When the surface temperature is in the range, it is more preferable in viewpoints of image quality, scratch resistance, clogging reduction, or high gloss.

The drying step can be performed simultaneously with one or both of the white ink adhesion step and the non-white ink adhesion step. When the drying step is performed simultaneously with the white ink adhesion step and the non-white ink adhesion step, the surface temperature of the recording medium is preferably in the range. In particular, the surface temperature is set to be preferably 43° C. or lower and more preferably 40° C. or lower.

In the ink jet recording method of the present embodiment, since the drying step is performed by one or both of the blowing type and the radiation type, it is possible to reduce the mark of the suction hole of the platen, in recorded matter. In particular, a drying step using the blowing type is preferable in that the reduction of the suction hole mark is more excellent. In addition, drying step using the radiation type is preferable in that bleed reduction is more excellent.

In the drying step of the ink jet recording method of the present embodiment, a unit (conductive type) that heats the recording medium by contacting the recording medium with a member having heat may be further used. In this case, it is preferable in that since the drying efficiency is more excellent, bleed reduction or the like is more excellent. Examples of the member having heat include a support member of the recording medium. When heating is performed by contacting a platen having a suction hole with the recording medium by using the conductive type, a mark of the suction hole of the platen tends to more easily occur in the recorded matter. However, when the surface temperature of the recording medium is set to the temperature range, it is preferable in that it is possible to keep the mark of the suction hole of the platen small in the recorded matter.

4. Other Steps

The ink jet recording method of the present embodiment includes steps of causing the white ink and the non-white ink to adhere to the recording medium, respectively. In addition, the ink jet recording method may further include a step of causing one or more kinds of the treatment liquid, the white ink, and the non-white ink to adhere to the recording medium, as needed. In this case, an order and the number of these steps are not limited, and these steps can be appropriately performed as needed. Furthermore, the ink jet recording method of the present embodiment may further include a step of causing the treatment liquid to adhere to the recording medium or a step of heating the recording medium (post-heating step).

4.1. Treatment Liquid Adhesion Step

The ink jet recording method of the present embodiment may include the treatment liquid adhesion step of causing a treatment liquid containing an aggregating agent to adhere to a recording medium.

4.1.1. Treatment Liquid

The treatment liquid contains the aggregating agent.

4.1.1.1. Aggregating Agent

The treatment liquid contains the aggregating agent aggregating a component of inks (the white ink and the non-white ink). The aggregating agent reacts with a component such as a pigment contained in the ink and resin particles that may be contained in the ink, and thus has an action of aggregating the pigment or the resin particles. However, a degree of aggregation of the pigment or resin particles by the aggregating agent varies depending on respective types of the aggregating agent, the pigment, and the resin particles, and can be controlled. In addition, the aggregating agent reacts with the pigment and the resin particles contained in the ink, and thus can aggregate a pigment and resin particles. According to this aggregation, for example, it is possible to enhance color development of a pigment, enhance fixability of resin particles, and/or increase viscosity of an ink.

The aggregating agent is not particularly limited, and examples thereof include a metal salt, an inorganic acid, an organic acid, and a cationic compound. As the cationic compound, a cationic resin (a cationic polymer), a cationic surfactant, and the like can be used. Among these, a polyvalent metal salt is preferable as the metal salt, and a cationic resin is preferable as the cationic compound. Therefore, as the aggregating agent, it is preferable to use any one of the cationic resin, the organic acid, and the polyvalent metal salt in that image quality, scratch resistance, gloss, and the like to be obtained are particularly excellent.

The metal salt is preferably the polyvalent metal salt, but metal salts other than the polyvalent metal salt can also be used. Among these aggregating agents, it is preferable to use at least one selected from the metal salt and the organic acid, from a viewpoint of excellent reactivity with a component contained in the ink. In addition, among the cationic compounds, it is preferable to use cationic resin, from a viewpoint of easy dissolution in the treatment liquid. In addition, plural kinds of the aggregating agent can be used in combination.

The polyvalent metal salt is a compound formed of a divalent or higher valent metal ion and an anion. Examples of the divalent or higher valent metal ion include ions of calcium, magnesium, copper, nickel, zinc, barium, aluminum, titanium, strontium, chromium, cobalt, iron, and the like. Among the metal ions configuring the polyvalent metal salt, it is preferable to use at least one of the calcium ion and the magnesium ion, from a viewpoint of excellent aggregation property of a component of the ink.

Examples of the anion configuring the polyvalent metal salt include an inorganic ion or an organic ion. That is, the polyvalent metal salt in the present disclosure is formed of an inorganic ion or an organic ion and polyvalent metal. Examples of the inorganic ion include a chlorine ion, a bromine ion, an iodine ion, a nitrate ion, a sulfate ion, and a hydroxide ion. Examples of the organic ion include an organic acid ion, for example, a carboxylate ion.

The polyvalent metal compound is preferably an ionic polyvalent metal salt. In particular, when the polyvalent metal salt is a magnesium salt or a calcium salt, stability of the treatment liquid is further improved. In addition, as a counter ion of the polyvalent metal, any of an inorganic acid ion and an organic acid ion may be used.

Specific examples of the polyvalent metal salt include a calcium carbonate such as a heavy calcium carbonate and a light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. One kind of these polyvalent metal salts may be used alone and two or more kinds thereof may be used in combination. Among these, since sufficient solubility in water can be secured and a making residue by the treatment liquid is reduced (marks are not noticeable), at least any one of the magnesium sulfate, the calcium nitrate, and the calcium chloride is preferable and the calcium nitrate is more preferable. These metal salts may have hydration water in a raw material form.

Examples of the metal salts other than the polyvalent metal salt include a monovalent metal salt such as a sodium salt and a potassium salt, for example, sodium sulfate and potassium sulfate.

Preferred examples of the organic acid include poly(meth) acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, derivatives of these compounds, or salts thereof. One kind of the organic acids may be used alone and two or more kinds thereof may be used in combination. The salts of the organic acids which are metal salts are included in the metal salts described above.

Preferred examples of the inorganic acid include sulfuric acid, hydrochloric acid, nitric acid, and phosphoric acid, or salts thereof. One kind of the inorganic acids may be used alone and two or more kinds thereof may be used in combination. The salts of the inorganic acids which are metal salts are included in the metal salts described above.

Examples of the cationic resin (the cationic polymer) include cationic urethane resin, cationic olefin resin, cationic amine resin, and a cationic surfactant. The cationic polymer is preferably water soluble.

As the cationic urethane resin, a commercially available can be used. For example, HYDRAN CP-7010, CP-7020, CP-7030, CP-7040, CP-7050, CP-7060, and CP-7610 (trade name, manufactured by Dainippon Ink and Chemicals, Incorporated), SUPERFLEX 600, 610, 620, 630, 640, and 650 (trade name, Dai-ichi Kogyo Seiyaku Co., Ltd.), and Urethane Emulsion WBR-2120C and WBR-2122C (trade name, Taisei Fine Chemical Co., Ltd.) can be used.

The cationic olefin resin has an olefin such as ethylene or propylene in a structural skeleton, and a known one can be appropriately selected and used. In addition, the cationic olefin resin may be in a form of an emulsion dispersed in a solvent containing water, an organic solvent, and the like. As the cationic olefin resin, a commercially available product can be used, and examples thereof include ARROWBASE CB-1200 and CD-1200 (trade name, manufactured by UNITICA LTD).

The cationic amine resin may have an amino group in a skeleton, and a known one can be appropriately selected and used. Examples thereof include polyamine resin, polyamide resin, and polyallylamine resin. The polyamine resin is a resin having an amino group in a main skeleton of the resin. The polyamide resin is a resin having an amide group in a main skeleton of the resin. The polyallylamine resin is a resin having a structure derived from an allyl group in a main skeleton of the resin.

In addition, examples of the cationic polyamine resin can include UNISENCE KHE 103L manufactured by SENKA Corporation (hexamethylenediamine/epichlorohydrin resin, an aqueous solution having a 1% aqueous solution pH of approximately 5.0, viscosity of 20 to 50 (mPa·s), and a solid content concentration of 50% by mass) and UNISENCE KHE 104 L (dimethylamine/epichlorohydrin resin, an aqueous solution having a 1% aqueous solution pH of approximately 7.0, viscosity of 1 to 10 (mPa·s), a solid content concentration of 20% by mass). Furthermore, specific examples of the commercially available product of the cationic polyamine resin include FL-14 (manufactured by SNF group), ARAFIX 100, 251S, 255, and 255LOX (manufactured by Arakawa Chemical Industries, Ltd.), DK-6810, 6853, 6885; WS-4010, 4011, 4020, 4024, 4027, 4030 (manufactured by SEIKO PMC CORPORATION), PAPYOGEN P-105 (manufactured by SENKA Corporation), Sumirez Resin 650(30), 675A, 6615, SLX-1 (manufactured by Taoka Chemical Co., Ltd.), Catiomaster® PD-1, 7, 30, A, PDT-2, PE-10, PE-30, DT-EH, EPA-SK01, TMHMDA-E (manufactured by Yokkaichi Chemical Co., Ltd.), and JET-FIX 36N, 38A, and 5052 (manufactured by Satoda Chemical Industrial Co., Ltd.).

Examples of the polyallylamine resin can include polyallylamine hydrochloride, polyallylamine amide sulfate, an allylamine hydrochloride.diallylamine hydrochloride copolymer, an allylamine acetate.diallylamine acetate copolymer, an allylamine acetate.diallylamine acetate copolymer, an allylamine hydrochloride.dimethylallylamine hydrochloride copolymer, an allylamine.dimethylallylamine copolymer, polydiallylamine hydrochloride, polymethyldiallylamine hydrochloride, polymethyldiallylamine amide sulfate, polymethyldiallylamine acetate, polydiallyl dimethyl ammonium chloride, a diallylamine acetate sulfur dioxide copolymer, a diallyl methyl ethyl ammonium ethyl sulfate sulfur dioxide copolymer, a methyl diallylamine hydrochloride.sulfur dioxide copolymer, a diallyldimethyl ammonium chloride.sulfur dioxide copolymer, and a diallyldimethyl ammonium chloride.acrylamide copolymer.

Examples of the cationic surfactant include primary, secondary, and tertiary amine salt compounds, an alkylamine salt, a dialkylamine salt, an aliphatic amine salt, a benzalkonium salt, a quaternary ammonium salt, a quaternary alkylammonium salt, an alkyl pyridinium salt, a sulfonium salt, a phosphonium salt, an onium salt, and an imidazolinium salt. Specific examples thereof include hydrochlorides or acetates of laurylamine, coconut amine, and rosin amine, lauryl trimethyl ammonium chloride, cetyltrimethylammonium chloride, benzyl tributylammonium chloride, benzalkonium chloride, dimethylethyl lauryl ammonium ethyl sulfate, dimethylethyl octyl ammonium ethyl sulfate, trimethyl lauryl ammonium hydrochloride, cetyl pyridinium chloride, cetyl pyridinium bromide, dihydroxyethyl laurylamine, decyldimethylbenzyl ammonium chloride, dodecyl dimethyl benzyl ammonium chloride, tetradecyldimethyl ammonium chloride, hexadecyldimethyl ammonium chloride, and octadecyl dimethyl ammonium chloride.

A plurality kinds of these aggregating agents may be used. In addition, when at least one of the polyvalent metal salt, the organic acid, and the cationic resin is selected among these aggregating agents, an aggregation action is more favorable. Therefore, it is possible to form an image with higher quality (particularly, favorable in color development).

A total content of the aggregating agent in treatment liquid is, for example, from 0.1% by mass to 20.0% by mass, preferably from 0.5% by mass to 15.0% by mass, and more preferably from 2.0% by mass to 10.0% by mass, relative to total mass of the treatment liquid. Even when the aggregating agent is shared by a solution or a dispersion, the content is preferably in the above range in terms of a solid content. When the content of the aggregating agent is 0.1% by mass or more, a function of the aggregating agent to aggregate a component contained in the ink can be sufficiently obtained. In addition, when the content of the aggregating agent is 30.0% by mass or less, solubility or dispersibility of the aggregating agent in the treatment liquid becomes more favorable. Therefore, it is possible to improve storage stability and the like of the treatment liquid.

From a viewpoint that, even when the organic solvent contained in the treatment liquid has high hydrophobicity, the aggregating agent has a high solubility in the treatment liquid, it is preferable to use the aggregating agent of which solubility in 100 g of water at 25° C. is 1 g or more, and it is more preferable to use the aggregating agent of which the solubility is from 3 g to 80 g.

4.1.1.2. Other Components

The treatment liquid may contain a component such as a resin particle, a water soluble organic solvent, a surfactant, water, wax, an additive, a resin dispersant, preservative.fungicide, a rust inhibitor, a chelating agent, a viscosity modifier, an antioxidant, and an anti-mold agent, in addition to the aggregating agent, as long as the function is not impaired. These components are all the same as those in the white ink described above. Therefore, a detailed description thereof will not be repeated.

4.1.2. Physical Properties of Treatment Liquid and Method of Causing Treatment Liquid to Adhere to Recording Medium In the treatment liquid, from a viewpoint of making wet spreading to the recording medium appropriate, a surface tension at 25.0° C. is 40.0 mN/m or less, preferably 38.0 mN/m or less, more preferably 35.0 mN/m or less, and still more preferably 30.0 mN/m or less.

As a method of causing the treatment liquid to adhere to the recording medium, any of a non-contact method and a contact method, an ink jet method, a method using application, a method of applying the treatment liquid to the recording medium using various sprays, a method of application by immersing the recording medium in the treatment liquid, and a method of applying the treatment liquid to the recording medium using a brush or the like, or a method obtained by combining these can be used.

The ink jet recording method according to the present embodiment may be performed using an ink jet recording apparatus having a recording head.

When the treatment liquid adheres to the recording medium by the ink jet method, viscosity thereof at 20.0° C. is set to be preferably from 1.5 mPa·s to 15.0 mPa·s, more preferably from 1.5 mPa·s to 7.0 mPa·s, and still more preferably from 1.5 mPa·s to 5.5 mPa·s. When the treatment liquid adheres to the recording medium by the ink jet method, it is easy to efficiently form a predetermined treatment liquid adhesion region on the recording medium.

4.2. Post-Heating Step

The ink jet recording method according to the present embodiment may further include the post-heating step of further heating the recording medium after the ink adhesion step. The post-heating step can be performed using, for example, an appropriate heating unit. The post-heating process is performed, for example, by an after-heater (corresponding to a heating heater 5 is an example of the ink jet recording apparatus to be described later). In addition, the heating unit is not limited to the heating units provided in the ink jet recording apparatus, and another drying unit may also be used. Accordingly, since an obtained image can be more sufficiently fixed by drying, for example, it is possible to make recorded matter being in a usable state immediately.

In this case, the temperature of the recording medium is not particularly limited, and can be set in consideration of, for example, the Tg of the resin component forming the resin particles contained in the recorded matter. When considering the Tg of the resin component forming the resin particles or wax, the temperature may be set to 5.0° C. or higher, preferably 10.0° C. or higher than the Tg of the resin component forming the resin particles.

The temperature reached by heating in the post-heating step is from 30.0° C. to 120.0° C., preferably from 40.0° C. to 100.0° C., more preferably from 50.0° C. to 95.0° C., and particularly preferably from 70.0° C. to 90.0° C. When the temperature of the recording medium is approximately in the range, film formation and planarization of the resin particles or the wax contained in the recorded matter can be performed, and the obtained image can be more sufficiently fixed by drying.

5. Relative Relationship Between Thickening Ratios of Inks

In the ink jet recording method of the present embodiment, there is a preferable correlation between the thickening ratio of the white ink and the thickening ratio of the non-white ink. That is, it is preferable that a thickening ratio of the ink adhering in the step performed later among the white ink adhesion step and non-white ink adhesion step is greater than a thickening ratio of the ink adhering in the step performed first. In this relation, when the treatment liquid adhesion step is added to the ink jet recording method of the present embodiment, at the time of adhesion of the white ink and the non-white ink, the viscosity of the ink adhering later is higher than the viscosity of the ink adhering first. Therefore, the scratch resistance of the image tends to be more favorable.

In addition, a difference between the thickening ratio of the white ink and the thickening ratio of the non-white ink is preferably 10.0 or less, more preferably 7.0 or less, still more preferably 5.0 or less, particularly preferably 4.0 or less, and further still more preferably 3.0 or less. In addition, the difference is preferably 1 or more and more preferably 2 or more.

When the difference between the thickening ratios is in the range, it is preferable in that the degree of freedom in design for each ink is high. In addition, when the thickening ratio of both the white ink and the non-white ink is small, the image quality may tend to be slightly inferior. However, when at least one of the white ink and the non-white ink has a thickening ratio greater than that of the other in a certain degree, specific image quality can often be secured.

6. Adhesion Amount in Ink Jet Recording Method

The adhesion amount of the white ink adhering to the recording medium is preferably 5.0 mg/inch$^2$ or more, more preferably 7.0 mg/inch$^2$ or more, and still more preferably 15.0 mg/inch$^2$, in the recording area of the recording medium. Also, the adhesion amount is preferably 25.0 mg/inch$^2$ or less, and more preferably 20.0 mg/inch$^2$ or less.

When forming such the area, it is possible to further enhance quality of an image to be obtained. When the adhesion amount is referred to as the adhesion amount described above, this means that in an area of the recording area, to which the white ink and the non-white adhere, there is at least an area where the adhesion amount of the white ink is in the above range. Preferably, in the area, it is more preferable that the adhesion amount of the white ink is in the above range, in an area where the adhesion amount of the white ink is the largest.

7. Procedure and Modification of Steps in Ink Jet Recording Method

A procedure of performing the white ink adhesion step and the non-white ink adhesion step is not particularly limited. However, it is more preferable that the white ink adhesion step is performed before the non-white ink adhesion step. In this manner, when the image is formed on the recording medium, a background image is formed by the white ink and a foreground image is formed by the non-white ink. Therefore, definition or the like of the image becomes better and the image quality is improved.

Also, when providing the treatment liquid adhesion step, it is more preferable that the treatment liquid adhesion step is performed prior to the white ink adhesion step and the non-white ink adhesion step. In this manner, the aggregating agent contained in the treatment liquid can be caused to act directly on the white ink. An expression "performed prior to" means that the treatment liquid adheres to an area of the recording medium, where the white ink and the non-white ink will adhere by main scanning, by main scanning before the main scanning in which the white ink and the non-white ink are caused to adhere. Such a form of adhesion is performed using an arrangement of the discharge nozzle groups, in which the discharge nozzle group of the treatment liquid is disposed upstream of the discharge nozzle groups of the white ink and the non-white ink in the sub-scanning direction. An area of the recording medium where the ink will adhere by a certain main scanning is an area of the recording medium that the discharge nozzle group of the ink faces in the main scanning.

It is more preferable that the treatment liquid adhesion step is performed after the white ink adhesion step and before the non-white ink adhesion step. In this manner, the aggregating agent contained in the treatment liquid is easily caused to act directly on the white ink. In this manner, the aggregating agent contained in the treatment liquid can be caused to act directly on the non-white ink.

Furthermore, the treatment liquid adhesion step may also be performed simultaneously with the white ink adhesion step and/or the non-white ink adhesion step. In this case, an expression "simultaneously" refers to a case where the steps are performed on the same area of the recording medium at the same main scanning. A form of this adhesion step is referred to as a simultaneous ejection. The form of this adhesion is performed using an arrangement of the discharge nozzle groups, in which a position of the discharge nozzle group of the treatment liquid has a portion overlapping the discharge nozzle groups of the white ink and/or the non-white ink in the sub-scanning direction, when projected in the main scanning direction.

The form of prior performing or the form of simultaneous ejection are forms realized in adhesion steps of two or more types of ink and the treatment liquid.

Also, a white ink layer formed by the white ink adhesion step and a non-white ink layer formed by the non-white ink adhesion step may be stacked on the recording medium. In this manner, for example, it is possible to form a non-white image bordered with a white image, and it is possible to obtain a sharp image. In addition, the background is concealed by the white ink. Accordingly, it is possible to prevent the image quality from deteriorating due to the color of the recording medium and the like.

8. Recording Medium

The recording medium to which an image is formed by the ink jet recording method according to the present embodiment may have a recording face that absorbs liquid such as the ink and the treatment liquid or may not have the recording face that absorbs a liquid. Therefore, the recording medium is not particularly limited, and examples thereof include a liquid absorbent recording medium such as paper, a film, and cloth, a liquid low-absorbent recording medium such as printing paper, and a liquid non-absorbent recording medium such as metal, glass, and polymer. However, an excellent effect of the ink jet recording method of the present embodiment is more remarkable when recording an image on the liquid low-absorbent or liquid non-absorbent recording medium.

The liquid low-absorbent or liquid non-absorbent recording medium refers to a recording medium having a property of not absorbing or hardly absorbing the ink or the treatment liquid. Quantitatively, the liquid non-absorbent or liquid low-absorbent recording medium refers to "a recording medium of which water absorption amount from start of contact to 30 msec$^{1/2}$ in the Bristow method is 10 mL/m$^2$ or less". The Bristow method is most widely used as a method of measuring the liquid absorption amount in a short time, and is also employed in Japan Technical Association of Pulp and Paper Industry (JAPAN TAPPI). The details of the test method are described in Standard No. 51 "paper and cardboard, liquid absorption test method-Bristow method" of "JAPAN TAPPI Paper Pulp Test Method 2000 Edition". On the other hand, the liquid absorbent recording medium refers to a recording medium which does not correspond to the liquid non-absorbent and liquid low-absorbent recording media. In the present specification, expressions "liquid low-absorbent and liquid non-absorbent" may be referred to simply as "low-absorbent and non-absorbent".

Examples of the liquid non-absorbent recording medium include a recording medium obtained by coating a substrate such as paper with plastic, a recording medium obtained by bonding a plastic film onto a substrate such as paper, and a plastic film without an absorbent layer (a reception layer). Examples of the plastic stated here include polyvinyl chloride, polyethylene terephthalate, polycarbonate, polystyrene, polyurethane, polyethylene, and polypropylene.

In addition, examples of the liquid low-absorbent recording medium include a recording medium provided with a coating layer (a reception layer) configured to receive a liquid such as the ink or the treatment liquid on a surface. Examples of the recording medium when a substrate is the paper include printing paper such as art paper, coated paper, and matte paper. Examples of the recording medium when a substrate is the plastic film include a recording medium obtained by coating a surface of polyvinyl chloride, polyethylene terephthalate, polycarbonate, polystyrene, polyurethane, polyethylene, polypropylene, and the like with a hydrophilic polymer and the like and a recording medium obtained by coating the surface with particles of silica, titanium, and the like along with a binder.

The recording medium may be colorless and transparent, translucent, colored and transparent, chromatic opaque, achromatic opaque, and the like. Also, the recording medium itself may be colored, translucent, or transparent. In this case, when using the white ink as an ink for a background image, the white ink can function as a concealing layer that conceals a color of the recording medium itself. Also, for example, at the time of recording a color image, when the background image is recorded in advance on an area, to which a color image will be recorded, by the ink for a background image, it is possible to improve color development of the color image, in some cases.

9. Ink Jet Recording Apparatus

An example of an ink jet recording apparatus in which the ink jet recording method according to the present embodiment is performed will be described with reference to the drawings.

Figure 2:
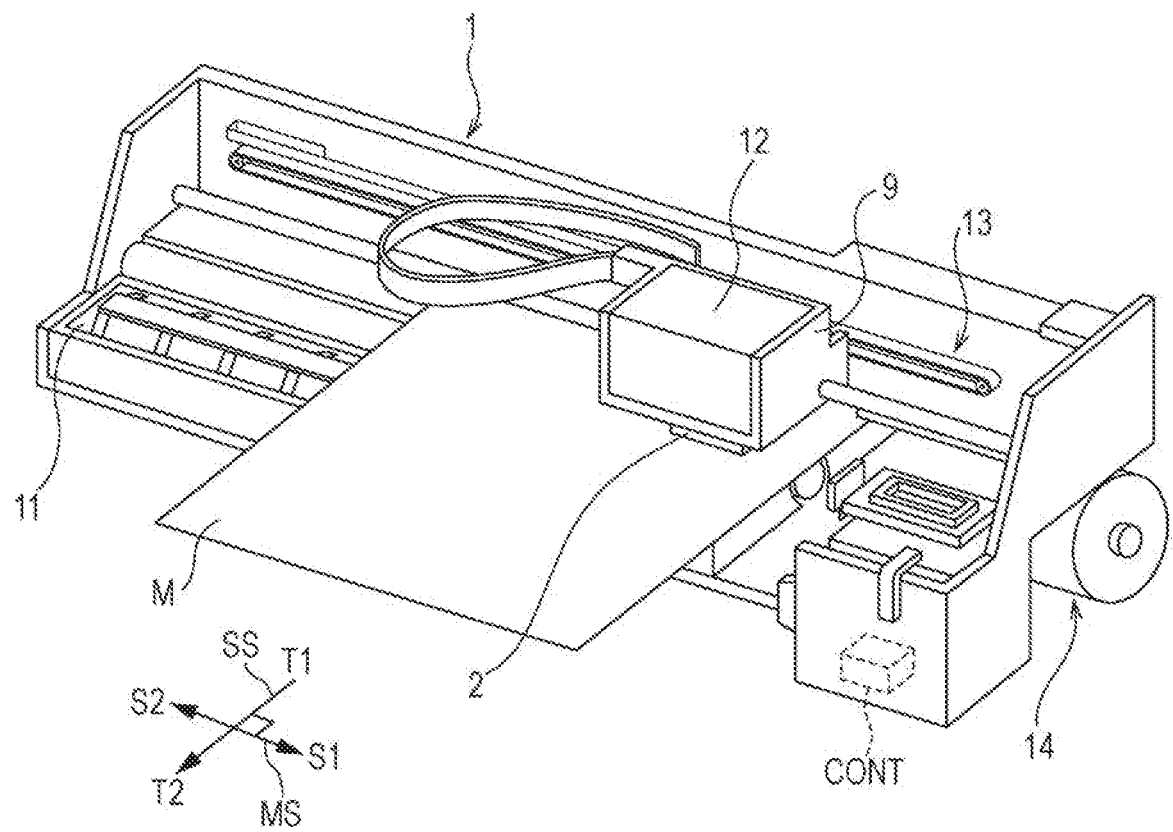
FIG. 2 is a schematic view of a periphery of a carriage of an example of an ink jet recording apparatus used in an ink jet recording method of an embodiment.

FIG. 1 is a schematic sectional view schematically showing an ink jet recording apparatus 1. FIG. 2 is a perspective view showing an example of a configuration of a periphery of the ink jet recording apparatus 1 in FIG. 1. As shown in FIGS. 1 and 2, the ink jet recording apparatus 1 includes a recording head 2, an IR heater 3, a platen heater 4, a heating heater 5, a cooling fan 6, a preheater 7, and a ventilation fan 8, a carriage 9, a platen 11, a carriage moving mechanism 13, a transporter 14, and a controller CONT. In the ink jet recording apparatus 1, the controller CONT shown in FIG. 2 controls operations of an entirety of the ink jet recording apparatus 1.

The recording head 2 is configured to perform recording on a recording medium M by discharging the ink and the treatment liquid from nozzles of the recording head 2 to adhere. In the present embodiment, the recording head 2 is a serial type recording head and the recording medium M is scanned multiple times in the main scanning direction with the recording head 2, and thus the ink and the treatment liquid adheres to the recording medium M. The recording head 2 is mounted on the carriage 9 shown in FIG. 2. The recording medium M is relatively scanned multiple times in the main scanning direction with the recording head 2, by an operation of the carriage moving mechanism 13 that moves the carriage 9 in a medium width direction of the recording medium M. The media width direction is the main scanning direction of the recording head 2. The scanning in the main scanning direction is also referred to as a main scanning.

Here, the main scanning direction is a direction in which the carriage 9 on which recording head 2 was mounted moves. In FIG. 1, the main scanning direction intersects the sub-scanning direction indicated by an arrow SS, which is a transport direction of the recording medium M. In FIG. 2, the width direction of the recording medium M, that is, the direction represented by S1-S2 is a main scanning direction MS, and a direction represented by T1-T2 is a sub-scanning direction SS. In one scanning, the scanning is performed in the main scanning direction, that is, in any one direction of the arrow S1 and the arrow S2. Then, the recording is performed on the recording medium M by repeating the main scanning of the recording head 2 and sub-scanning which is a transport of the recording medium M, plural times.

The cartridge 12 supplying the ink or the treatment liquid to the recording head 2 includes a plurality of independent cartridges. The cartridge 12 is detachably attached to the carriage 9 on which the recording head 2 is mounted. Each of the plurality of cartridges is filled with different types of ink or treatment liquid, and the cartridge 12 supplies the ink or the treatment liquid to each nozzle. In the present embodiment, the cartridge 12 is exemplified as being mounted on the carriage 9. However, the present disclosure is not limited thereto. The cartridge 12 may be provided at a location other than the carriage 9 and may be supplied to each nozzle using a supply tube (not shown).

For the discharge of the recording head 2, a known method of the related art can be used. In the present embodiment, a method of discharging a droplet using vibration of a piezoelectric element, that is, a discharge method of forming an ink droplet by mechanical deformation of an electrostrictive element is used.

The ink jet recording apparatus 1 includes the IR heater 3 and the platen heater 4 configured to heat the recording medium M when the ink or the treatment liquid is discharged from the recording head 2. In the present embodiment, when drying the recording medium M in the drying step, the IR heater 3 and the ventilation fan 8 (which is described later), or the like can be used.

When using the IR heater 3, the recording medium M can be heated by a radiation method by infrared radiation from a recording head 2 side. Accordingly, although the recording head 2 is also likely to be heated at the same time, the temperature can be raised without being affected by a thickness of the recording medium M, compared to a case of heating the recording medium M from a back surface thereof, as the platen heater 4. In addition, various kinds of fans (for example, the ventilation fan 8) that apply warm air or air having the same temperature as in an environment to the recording medium M to dry the ink of the treatment liquid on the recording medium M may also be provided.

The platen heater 4 can heat the recording medium M at a position facing the recording head 2 through the platen 11 such that the treatment liquid or the ink discharged by the recording head 2 can be dried early from the time when attached to the recording medium M. The platen heater 4 can conductively heat the recording medium M, and is used as needed in the ink jet recording method of the present embodiment as described above. When using the platen heater 4, it is preferable to control the surface temperature of the recording medium M to be 40.0° C. or lower.

An upper limit of the surface temperature of the recording medium M by the IR heater 3 and the platen heater is preferably 45.0° C. or lower, more preferably 40.0° C. or lower, still more preferably 38.0° C. or lower, and particularly preferably 35.0° C. or lower. Also, a lower limit of the surface temperature of the recording medium M is preferably 25.0° C. or higher, more preferably 28.0° C. or higher, still more preferably 30.0° C. or higher, and particularly preferably 32.0° C. or higher. Accordingly, it is possible to prevent the ink or the treatment liquid in the recording head 2 from being dried and compositional varying, and deposition of the ink or the resin on an inner wall of the recording head 2 is suppressed. In addition, it is possible to fix the ink or the treatment liquid early on recording medium M, and it is possible to improve the image quality.

The heating heater 5 is a heater that dries and solidifies the ink adhering to the recording medium M, that is, a heater for secondary heating or secondary drying. The heating heater 5 can be used in the post-heating step. When the heating heater 5 heats the recording medium M on which the image was recorded, water contained in the ink is more quickly evaporated and scattered, and an ink film is formed by the resin contained in the ink. In this manner, the ink film is firmly fixed or bonded on the recording medium M. Accordingly, an excellent film forming property is obtained and an excellent image with high quality can be obtained in a short time. An upper limit of the surface temperature of the recording medium M by the heating heater 5 is preferably 120.0° C. or lower, more preferably 100.0° C. or lower, and still more preferably 90.0° C. or lower. Also, a lower limit of the surface temperature of the recording medium M is preferably 60.0° C. or higher, more preferably 70.0° C. or higher, and still more preferably 80.0° C. or higher. When the temperature is in the range, an image with high quality can be obtained in a short time.

The ink jet recording apparatus 1 may further include the cooling fan 6. When the ink recorded on recording medium M is dried and then the ink on the recording medium M is cooled by the cooling fan 6, an ink coating film can be formed on recording medium M with good adhesion.

In addition, the ink jet recording apparatus 1 may further include the preheater 7 which preheats the recording medium M before the ink adheres to the recording medium M. Furthermore, the ink jet recording apparatus 1 may further include the ventilation fan 8 such that the ink of the treatment liquid adhering to the recording medium M is more efficiently dried.

The ink jet recording apparatus includes the platen supporting the recording medium M, the carriage moving mechanism 13 moving the carriage 9 relative to the recording medium M, and the transporter 14 which is a roller for transporting the recording medium M in the sub-scanning direction, below the carriage 9. Operations of the carriage moving mechanism 13 and the transporter 14 are controlled by the controller CONT.

Figure 3:
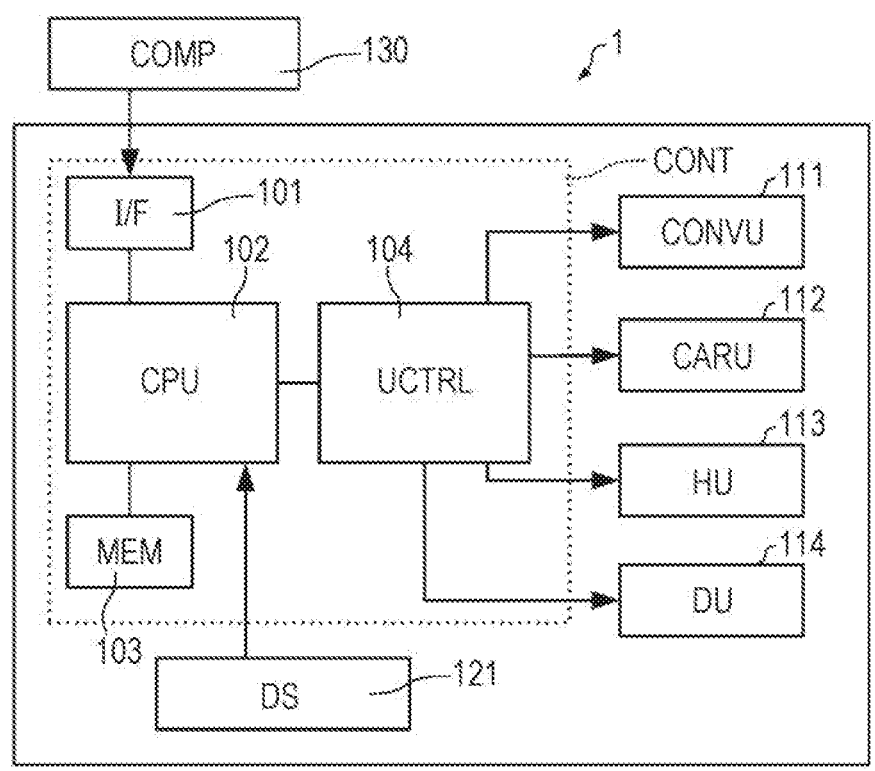
FIG. 3 is a block diagram of an example of an ink jet recording apparatus used in an ink jet recording method of an embodiment.

FIG. 3 is a functional block diagram of the ink jet recording apparatus 1. The controller CONT is a control unit configured to control the ink jet recording apparatus 1. An interface unit 101 (I/F) transmits and receives data between a computer 130 (COMP) and the ink jet recording apparatus 1. A CPU 102 is an arithmetic processing unit configured to control the entire ink jet recording apparatus 1. A memory 103 (MEM) secures an area storing a program of the CPU 102, a working area, or the like. The CPU 102 controls each unit by a unit control circuit 104 (UCTRL). A detector group 121 (DS) monitors a status in the ink jet recording apparatus 1, and the controller CONT controls each unit based on the detection result.

A transport unit 111 (CONVU) controls the sub-scanning (transport) of the ink jet recording, and specifically controls a transport direction and a transport speed of the recording medium M. Specifically, the transport direction and the transport speed of the recording medium M are controlled by controlling a rotating direction and a rotational speed of the transport roller driven by a motor.

A carriage unit 112 (CARU) controls the main scanning (pass) of the ink jet recording, and specifically, reciprocates the recording head 2 in the main scanning direction. The carriage unit 112 includes the carriage 9 on which the recording head 2 is mounted and the carriage moving mechanism 13 configured to reciprocate the carriage 9.

A head unit 113 (HU) controls a discharge amount of the treatment liquid or the ink from the nozzle of the recording head 2. For example, when the nozzles of the recording head 2 are driven by the piezoelectric element, the head unit 113 controls an operation of the piezoelectric element in each nozzle. The head unit 113 controls a timing of adhesion of each ink, a dot size of the ink or the treatment liquid, and the like. In addition, the adhesion amount of the treatment liquid or the ink per scan is controlled by combining the controls of the carriage unit 112 and the head unit 113.

A drying unit 114 (DU) controls the temperatures of various heaters such as the IR heater 3, the preheater 7, the platen heater 4, and the heating heater 5.

The ink jet recording apparatus 1 alternately repeats the operation of moving the carriage 9 on which the recording head 2 is mounted in the main scanning direction and the transport operation (sub-scanning). In this case, when performing each pass, the controller CONT controls the carriage unit 112 to move the recording head 2 in the main scanning direction, and controls the head unit 113 to discharge droplets of the treatment liquid or the ink from a predetermined nozzle hole of the recording head 2 to cause the droplets of the treatment liquid or the ink to adhere to the recording medium M. In addition, the controller CONT controls the transport unit 111 to transport the recording medium M in the transport direction by a predetermined transport amount (feeding amount) at the time of the transport operation.

In the ink jet recording apparatus 1, the recording area to which a plurality of droplets (dots) adhering is gradually transported by repeating the main scanning (pass) and the sub-scanning (transport operation). Then, the droplets adhering to the recording medium M are dried by the after-heater 5 to complete the image. Thereafter, the completed recorded matter may be wound by a winding mechanism (not shown) or transported by a flat bed mechanism (not shown).

An arrangement of nozzle arrays of a nozzle face in the recording head 2 of the ink jet recording apparatus used for the ink jet recording method of the present embodiment will be described. Examples of the arrangement of the nozzle arrays of the nozzle face include an arrangement in which there are a first nozzle array and a second nozzle array in which nozzles are arranged in the sub-scanning direction, the first nozzle array and the second nozzle array are arranged to overlap each other when projected in the main scanning direction, each of the first nozzle array and the second nozzle array has a discharge nozzle group and a non-discharge nozzle group, the discharge nozzle group of the first nozzle array and the discharge nozzle group of the second nozzle array are arranged not to overlap each other when projected in the main scanning direction, and the discharge nozzle group of the first nozzle group is disposed upstream of the discharge nozzle group of the second nozzle array in the transport direction of the recording medium in the sub-scanning direction.

Figure 4:
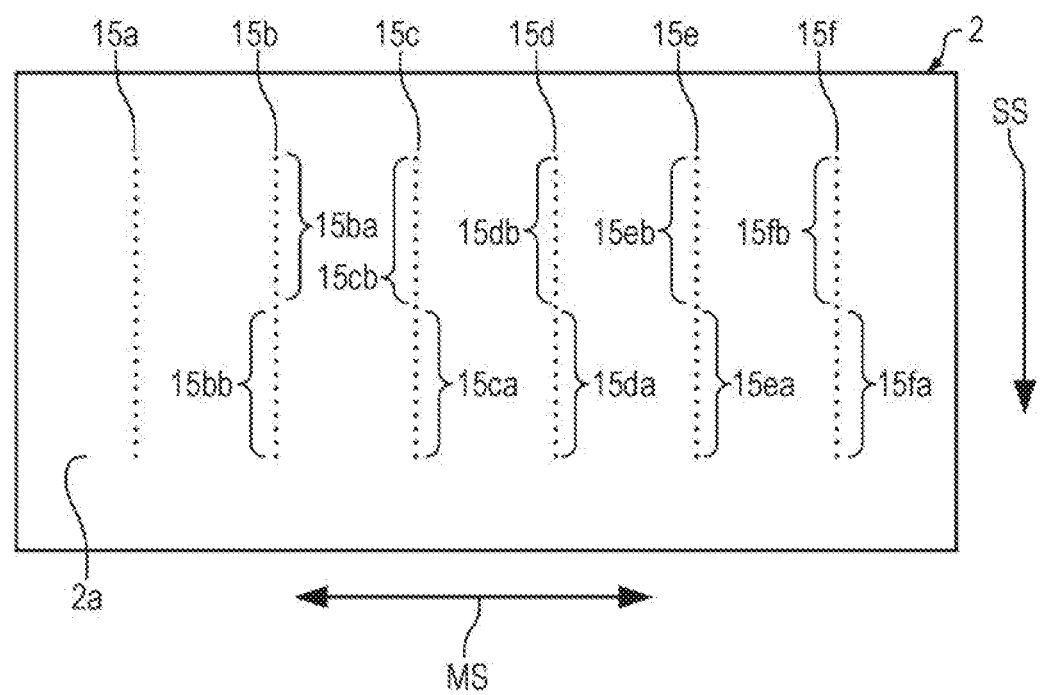
FIG. 4 is a schematic plan view of an example of a nozzle face of a recording head of an ink jet recording apparatus used in an ink jet recording method of an embodiment.

FIG. 4 schematically shows an example of an arrangement of nozzle arrays of a nozzle face 2a in the recording head 2. The recording head 2 has a nozzle face 2a in which a plurality of nozzles are formed. In the example shown in FIG. 4, in the nozzle face 2a of the recording head 2, a plurality of nozzle arrays 15a, 15b, 15c, 15d, 15e, and 15f in which a plurality of nozzles are arranged in the sub-scanning direction SS are formed. More nozzle arrays may further be provided. In FIG. 4, MS indicates the main scanning direction.

In the ink jet recording method of the present embodiment, when using the recording head 2 having the arrangement of the nozzle arrays exemplified in FIG. 4, for example, the nozzle array 15a, the nozzle array 15b, and the nozzle arrays 15c to 15f can be respectively filled with the treatment liquid, the white ink, and non-white ink and used. Any number of the nozzle arrays or any order of filling ink or the like may be adopted, and these can be designed as appropriate.

In the example shown in FIG. 4, positions of the nozzle arrays 15a to 15f, in the sub-scanning direction SS overlap each other. The nozzle arrays 15a to 15f may have portions in which positions in the sub-scanning direction SS overlap each other. In other words, the nozzle arrays 15a to 15f are arranged to overlap each other when projected in the main scanning direction MS.

Here, the recording head 2 can be controlled to perform recording by using each nozzle group including some nozzles, in each nozzle array. That is, each nozzle array can be selected to have a discharge nozzle group and a non-discharge nozzle group. Such selection can be performed, for example, in a manner that a user inputs a selection result to the controller CONT. In addition, a menu relating to the arrangement of the discharge nozzle group and the non-discharge nozzle group of each nozzle array is stored in advance in the memory 103 or the like, and the user may select the menu. Hereinafter, a set of nozzles used for recording in each nozzle array is referred to as a discharge nozzle group, and a set of nozzles not used for recording in each nozzle array is referred to as a non-discharge nozzle group.

In the example of FIG. 4, the nozzle array 15a which is filled with the treatment liquid does not include a non-discharge nozzle group, the nozzle array 15b which is filled with the white ink includes the discharge nozzle group 15ba and non-discharge nozzle group 15*bb*, and each of nozzle arrays 15*c* to 15*f* which are filled with the non-white ink respectively include discharge nozzle groups 15*ca* to 15*fa* and non-discharge nozzle groups 15*cb* to 15*fb*.

When two or more discharge nozzle groups of different nozzle arrays are arranged to overlap each other when projected in the main scanning direction MS, a liquid discharged from each nozzle array can be simultaneously ejected in one pass.

Also, when the discharge nozzle group is provided on an upstream in the sub-scanning direction SS in which the recording medium M is transported, the liquid discharged from the nozzle group can adhere to the recording medium M first.

For example, as shown in FIG. 4, in the ink jet recording method of the present embodiment, when the discharge nozzle group 15*ba* of the nozzle array 15*b* (the first nozzle array) and the discharge nozzle groups 15*ca* to 15*fa* of the nozzle arrays 15*c* to 15*f* (second nozzle array) do not overlap each other when projected in the main scanning direction and the discharge nozzle group of the first nozzle array is disposed upstream of the discharge nozzle group of the second nozzle array in the transport direction of the recording medium in the sub-scanning direction, the white ink can be caused to adhere to the recording medium M first.

In addition, a reverse arrangement is also possible. Although not shown, in the ink jet recording method of the present embodiment, when the discharge nozzle groups 15*ca* to 15*fa* of the nozzle arrays 15*c* to 15*f* (the first nozzle array) and the discharge nozzle group 15*ba* of the nozzle array 15*b* (second nozzle array) do not overlap each other when projected in the main scanning direction and the discharge nozzle group of the first nozzle array is disposed upstream of the discharge nozzle group of the second nozzle array in the transport direction of the recording medium in the sub-scanning direction, the non-white ink can be caused to adhere to the recording medium M first.

In the arrangement example shown in FIG. 4, the inks discharged from nozzle arrays having no portion in which positions in the sub-scanning direction overlap each other do not adhere to the same area on the recording medium in the same main scanning. For example, in a main scanning, the white ink with which the nozzle array 15*b* is filled adheres to a certain area. Then, in another main scanning, the non-white ink with which the nozzle arrays 15*c* to 15*f* are filled can adhere to the area.

In this manner, the white ink with which the nozzle array 15*b* is filled and the non-white ink with which the nozzle arrays 15*c* to 15*f* are filled adhere to each other at the same area after time longer than one main scanning time elapsed after adhering to the recording medium M. Accordingly, mixing of colors between the inks on the recording medium M is hard to occur, which is preferable.

Also, in the arrangement of the discharge nozzle groups shown in FIG. 4, the transport amount (feed amount) of the recording medium M to the sub-scanning direction SS in the sub-scanning can be set to be equal to or shorter than a length of the discharge nozzle group in the sub-scanning direction SS. For example, when white ink adheres to the recording area of the recording medium M in eight times of main scanning (8 passes), the transport amount (feed amount) of the recording medium M to the sub-scanning direction SS in sub-scanning may be ⅛ of a length of the discharge nozzle group in the sub-scanning direction SS. However, when the feed amount of recording medium M decreases, the recording speed decreases, or as will be described later, the number of times that the main scanning is performed in a state where a specific portion of the recording medium was positioned on a suction hole 31*b* of the platen 11 increases. However, when the feed amount of the recording medium M decreases, it is possible to form an image with higher quality.

In addition to the example shown in FIG. 4, in any nozzle array, discharge nozzle groups can be disposed separately and independently at any position. Also, an overlap of the nozzle arrays when projected in the main scanning direction MS may be designed to reduce the number of non-discharge nozzle groups, for example. Furthermore, lengths and the number of the discharge nozzle groups and the non-discharge nozzle groups in the nozzle array can be appropriately designed. The same is applied to the treatment liquid nozzle group.

For example, each nozzle array is divided into three equal parts from the upstream to the downstream in the sub-scanning direction. A first part of the treatment liquid nozzle array from the upstream in the sub-scanning direction is set as a treatment liquid discharge nozzle group. A second part of the white ink nozzle array from the upstream in the sub-scanning direction is set as the white ink discharge nozzle group. A third part of the non-white ink nozzle array from the upstream in the sub-scanning direction is set as the non-white ink discharge nozzle group. In this manner, the treatment liquid, the white ink, and the non-white ink can be caused to adhere to a predetermined recording area of the recording medium in this order.

Figure 5:
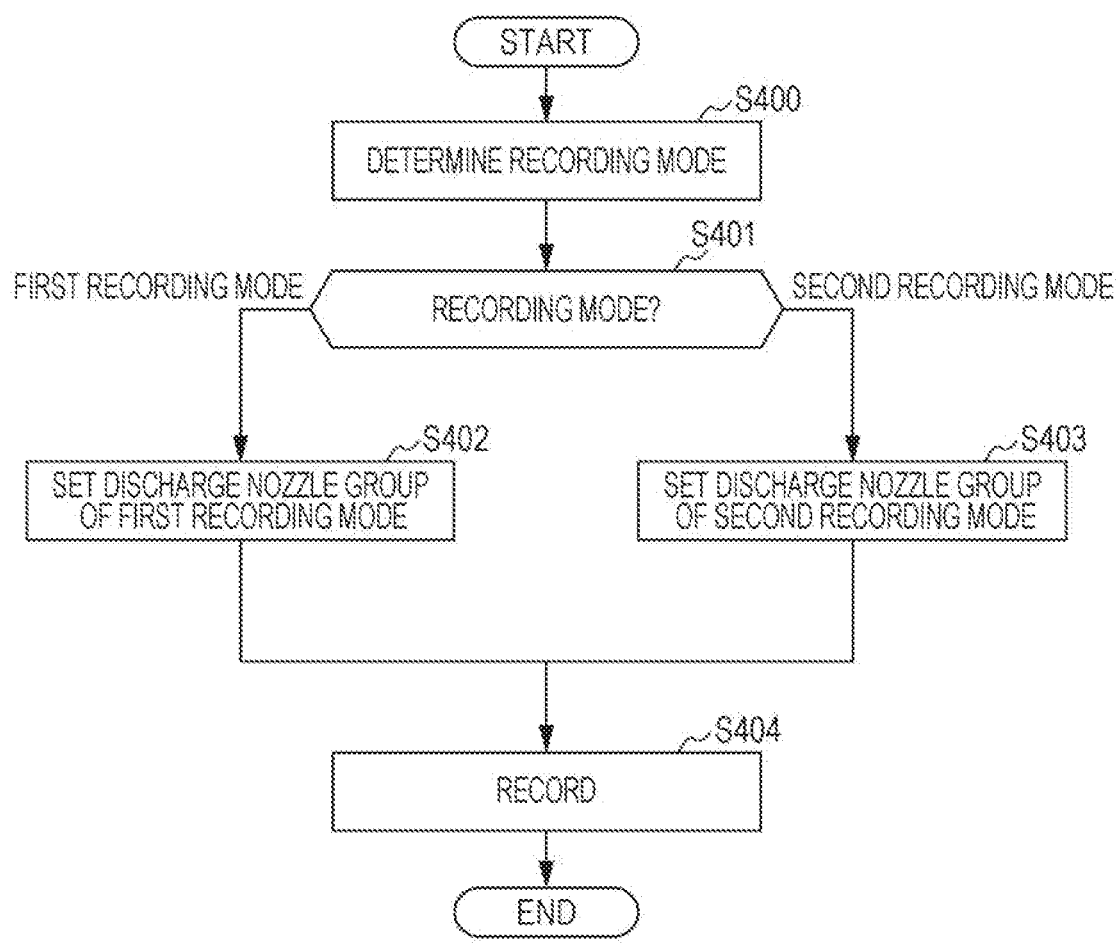
FIG. 5 is a flowchart illustrating an example of processing performed when recording is performed by an ink jet recording apparatus used in an ink jet recording method of an embodiment.

FIG. 5 is a flowchart illustrating processing performed when recording is performed in an ink jet recording apparatus. When starting the recording, the controller of the ink jet recording apparatus determines a recording mode in Step 400. The recording mode is a recording type in which details of the recording such as an arrangement of discharge nozzle groups or non-discharge nozzle groups used for recording, a discharge amount, an overprinting mode, an operation of the recording head at the time of recording, an operation of the recording medium were determined. The details of the recording may also include an adhesion amount of the treatment liquid and the like.

The recording mode is determined according to an input signal input from an external device such as a computer to the ink jet recording apparatus, or is determined according to input information that a user inputs to a user input unit provided in the ink jet recording apparatus. Here, the input signal from the external device or the input information from the user may be information directly designating the recording mode, and may also be information on recording, such as type information of a recording medium to which recording is performed, a designation of recording speed, or designation of image quality. Also, the information on recording is not limited thereto. In the latter case, correspondence information in which the recording mode corresponding to the information on the recording was determined is recorded in advance in the ink jet recording apparatus, such as the controller, the ink jet recording apparatus determines the recording mode referring to the correspondence information. Alternatively, the recording mode may be determined using an artificial intelligence technology (AI technology).

Figure 6:
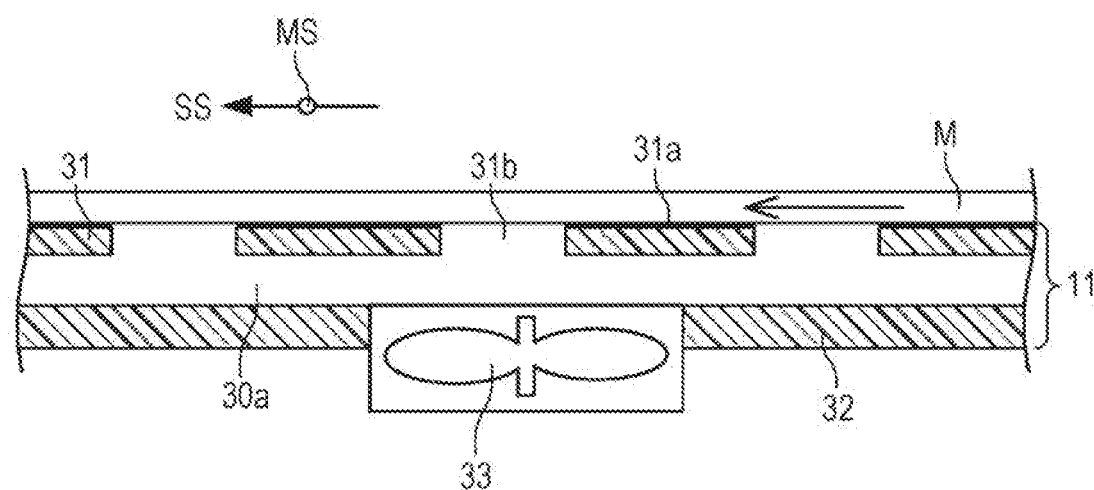
FIG. 6 is a schematic sectional view of an example of a platen of an ink jet recording apparatus used in an ink jet recording method of an embodiment.

In Step S401, the determined recording mode is discriminated. In Step S402 or S403, the discharge nozzle group associated with the recording mode is set according to the determined recording mode. In Step S404, recording is executed. FIG. 6 shows two types of the recording mode which are the first recording mode and the second recording mode, but the types of the recording mode may be three or more.

Figure 7:
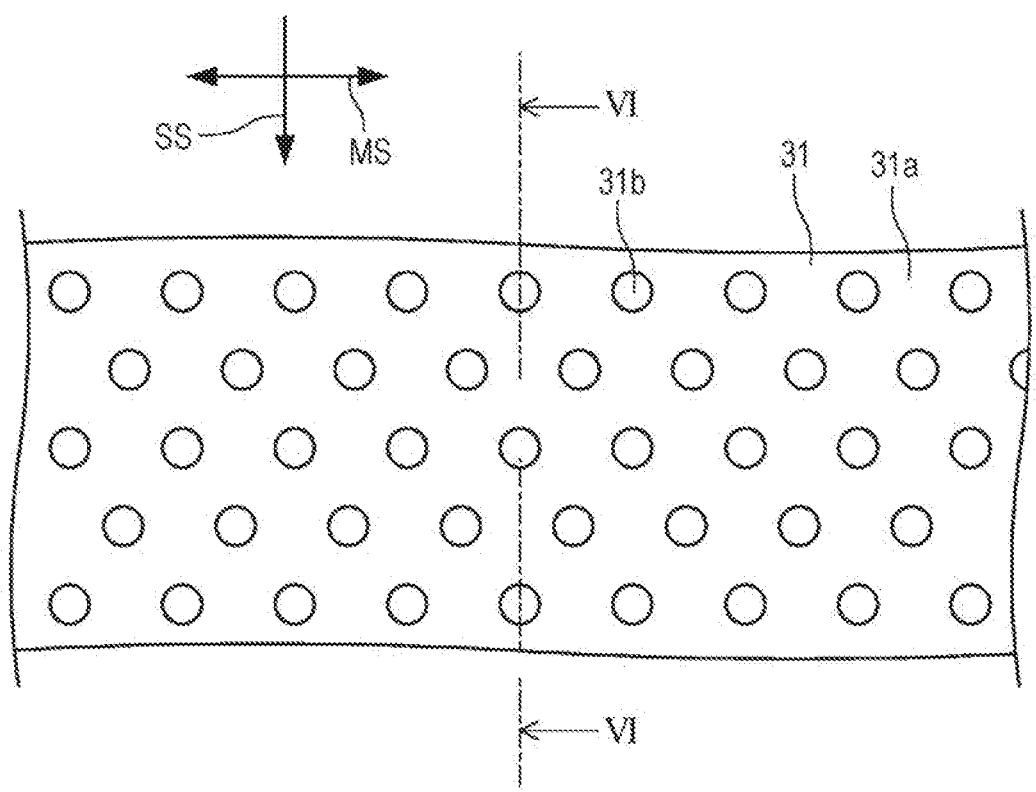
FIG. 7 is a schematic plan view of an example of a platen of an ink jet recording apparatus used in an ink jet recording method of an embodiment.

FIG. 6 is a schematic sectional view of the platen 11 of the ink jet recording apparatus 1, taken along a plane perpendicular to the main scanning direction MS. FIG. 7 is a schematic view of the platen 11 of the ink jet recording apparatus 1 as viewed in plan from an upper surface member 31 side. The platen is an example of the support member.

In the ink jet recording apparatus 1, during the recording operation, the recording medium M is transported on the platen 11 to the sub-scanning direction SS as shown in FIG. 4. The platen 11 includes an upper surface member 31 having a support surface 31a configured to support the recording medium M and a plurality of suction holes 31b opened in the support surface 31a. In addition, the platen 11 includes a bottom member 32 and a side member (not shown), and a space 30a is formed inside. The space 30a is in communication with the suction holes 31b. Furthermore, the platen 11 includes a fan 33 exhausting a gas inside the space 30a.

In the ink jet recording apparatus 1, when the recording medium M is transported on the platen 11, a pressure inside the space 30a becomes lower than a pressure of outside air by an operation of the fan 33. Accordingly, the recording medium M can be transported in a state of being drawn to the suction hole 31b. This makes it possible to prevent a distance between the recording head 2 and a surface of the recording medium M from varying.

The number, a shape, a size, and the like of the suction holes 31b of the platen 11 are not limited, as long as the functions can be exhibited. In examples shown in the drawing, the suction hole 31b is formed as a circular opening in plan view, but may be another shape such as a rectangle or an oval. The suction holes 31b are drawn relatively large for the purpose of description in examples shown in the drawing. However, when the suction hole is a circular opening, a diameter thereof is, for example, from 0.3 mm to 5.0 mm, preferably from 0.5 mm to 4.0 mm, and more preferably from 1.0 mm to 3.0 mm. When the suction hole 31b is formed in another shape, it is preferable to have an approximate opening area equivalent to the size exemplified in the case of the circle. Alternatively, a length of the suction hole in the sub-scanning direction may be the size described above.

A material of the platen 11 is not particularly limited, and is, for example, metal, plastic, or the like. In the platen 11, materials may be different for each member such as the upper surface member 31 and the bottom member 32. The upper surface member 31 of the platen 11 is preferably made of metal or plastic from a viewpoint of ease of design of the platen 11. In particular, the plastic is more preferable in that the reduction of the suction hole mark is more excellent. On the other hand, the metal is more preferable in that the bleed reduction is more excellent.

When referring the material of the platen (support member), it refers to at least a material of a member of the topmost part of the platen. The metal is not limited, and iron, copper, aluminum, stainless steel, and the like can be used. The plastic is not limited, and ABS resin, polyvinyl chloride resin, polycarbonate resin, polypropylene resin, polyethylene resin, acrylic resin, polystyrene resin, and the like can be used.

In addition, it is also preferable that an entirety of the platen 11 is formed of the plastic. The plastic has thermal conductivity lower than that of the metal. For example, when the recording medium M is dried from an upper surface by a blowing type or a radiation type (a radiant type) drying unit, it is easy to reduce a temperature difference between an area placed on the support surface 31a of recording medium M and an area placed on the suction hole 31b.

When the platen heater 4 described above is provided for the platen 11, the platen heater 4 is provided on a side of the bottom member 32 of the platen 11. When heating the recording medium M using the platen heater 4, the temperature difference between the area placed on the support surface 31a of the recording medium M and the area placed on the suction hole 31b is easy to occur. However, also in this case, when at least the upper surface member 31 of the platen 11 is formed of the plastic, the temperature difference can be suppressed to be small.

Depending on a dimension of the recording medium M, among the suction holes 31b of the platen 11, there may be suction holes 31b not blocked by the recording medium M. However, even in this case, it is possible to appropriately design such that the recording medium M can be drawn toward the platen 11, by adjusting a size and an arrangement of the suction holes 31b, the performance of the fan 33, and the like, or providing a cover or a sheet (not shown).

FIGS. 8A-8D are schematic views illustrating a positional relationship between a transport of the recording medium M and the suction holes 31b. In FIGS. 8A-8D, a circle drawn as a solid line represents the suction hole 31b. In addition, in FIGS. 8A-8D, a circle drawn by a broken line represents a position of an area, which was on the suction hole 31b, of the recording medium M after transport of the recording medium M. Furthermore, a transport amount of the recording medium M is indicated by an arrow.

In a recording process, first, recording is performed by the main scanning of the recording head 2, on the platen 11, in a state where the recording medium M was disposed on the suction hole 31b as shown in FIG. 8A. Next, the recording is performed by the main scanning of the recording head 2, in a state where the recording medium M was transported to the sub-scanning direction SS by a distance (feed amount) according to a recording method. FIG. 8B shows a case where the feed amount is (A). FIG. 8C shows a case where the feed amount is (B). FIG. 8D shows a case where the feed amount is (C).

An example of FIG. 8B shows a case where the feed amount is smaller than the diameter of the suction hole 31b. Even when the recording medium M is transported to the sub-scanning direction SS, the area of the recording medium M, which was on the suction hole 31b is still positioned above the same suction hole 31b before the transport.

An example of FIG. 8C shows a case where the feed amount is larger than the diameter of the suction hole 31b and is smaller than a distance between the centers of the suction holes 31b which overlap each other when projected in the sub-scanning direction SS and are adjacent to each other in the sub-scanning direction SS. In this case, when the recording medium M is transported to the sub-scanning direction, the area of the recording medium M, which was on the suction hole 31b is not positioned above the suction hole 31b.

An example of FIG. 8C shows a case where the feed amount is equal to or greater than a distance obtained by subtracting the diameter of the suction hole 31b from the distance between the centers of the suction holes 31b which overlap each other when projected in the sub-scanning direction SS and are adjacent to each other in the sub-scanning direction SS and equal to or smaller than a distance obtained by adding the diameter of the suction hole 31b to the distance between the centers.

In the examples, a state where although the recording medium M is transported to the sub-scanning direction SS, the area of the recording medium M, which was on the suction hole 31b, is positioned above the suction hole 31b, refers to a state of FIGS. 8B and 8D. Also, FIG. 8D shows an example in which the area is positioned above the adjacent suction hole 31b in the sub-scanning direction SS. However, the example also includes an example in which the feed amount is further increased, and the area is positioned above the suction hole 31b which overlaps when projected in the sub-scanning direction SS and is on a position farther from the adjacent suction hole 31b.

A state where although the recording medium M is transported to the sub-scanning direction SS, the area of the recording medium M, which was on the suction hole 31b, is positioned above the same suction hole 31b, is likely to occur when a planar shape of the suction hole 31b is a shape having a longitudinal in the sub-scanning direction SS (such as an ellipse or a rectangle shape having a long axis in the sub-scanning direction SS).

From FIGS. 8A-8D, it is understood that in a case where the feed amount of the recording medium M is small and a case where the feed amount is approximately a pitch of the suction holes 31b, a specific area of the recording medium M is likely to be positioned above the suction hole 31b. Among these cases, when the specific recording area of the recording medium M is scanned by plural times of main scanning (passes), the feed amount of the recording medium M decreases, and thus the former case is likely to occur.

The dryness of the treatment liquid or the ink on the recording medium M is different when the recording medium M is supported by the suction holes 31b or is supported by the support surface 31a. This causes unevenness (also referred to as a suction hole mark) in an image to be formed. Therefore, when the recording is performed by plural times of main scanning in a state where the area in the recording medium M is positioned on the suction hole 31b, a difference in the dryness of the treatment liquid or the ink on the recording medium M between recording areas becomes greater. Therefore, as in the ink jet recording method of the present embodiment, when the method includes the white ink adhesion step and the non-white ink adhesion step, the feed amount of the recording medium M tends to be small, and the suction hole mark is likely to occur.

Therefore, in the ink jet recording method of the present embodiment, in the step performed first among the white ink adhesion step and non-white ink adhesion step described above, the number of times of the main scanning which is performed in a state where an area of the recording medium M is supported on the suction hole 31b is preferably or less, more preferably 5 or less, and still more preferably 2 or less. In this case, it is preferable in that the reduction of the suction hole mark is more excellent. On the other hand, the number of times of the main scanning is 1 or more, preferably 2 or more, and more preferably 3 or more. In this case, it is preferable in that floating prevention in the recording medium is more excellent.

As described above, in the adhesion step of the ink adhering first, the number of times of the main scanning that is performed on a certain area of the recording medium on the suction hole may be different depending on the location of the recording medium, but is set to the maximum number in recording. The number of times is different because the number of times that the recording medium comes above the suction hole during recording varies depending on the location of the recording medium.

10. Examples and Comparative Examples

Hereinafter, an embodiment of the present disclosure will be described more specifically using Examples, but the present disclosure is not limited to these Examples. Hereinafter, "part(s)" and "%" are based on mass unless otherwise specified.

10.1. Preparation of Treatment Liquid, White Ink, and Non-White Ink

With material compositions shown in Table 1, treatment liquids R1 to R4, white inks W1 to W4, and non-white ink C1 all having different material compositions were obtained. Each composition was prepared in a manner that materials shown in Table 1 were placed in a container, stirred and mixed for 2 hours with a magnetic stirrer, and then filtered with a membrane filter with a pore size of 5 μm to remove impurities such as dust or coarse particles. All numerical values in Table 1 represent % by mass, and pure water was added such that the total mass of the composition became 100% by mass. A white pigment dispersion and a non-white coloring material dispersion were prepared as follows in advance. Also, the numbers in the Table 1 represent % by mass of a solid content in an ink to be supplied by the dispersion, % by mass of a solid content in an ink to be supplied by a resin particle emulsion, and % by mass of a solid content in an ink to be supplied by a wax emulsion, respectively.

Preparation of White Pigment Dispersion

First, 12 parts by mass of an acrylic acid-acrylic acid ester copolymer (weight average molecular weight: 25,000, acid value: 18) as a resin dispersant were added to and dissolved in 155 parts by mass of ion-exchanged water in which 0.1 parts by mass of 30% aqueous ammonia solution (neutralizing agent) was dissolved. 40 Parts by mass of titanium dioxide (C.I. pigment white 6) as a white pigment was added thereto, and dispersion treatment was performed for 10 hours in a ball mill using zirconia beads. Thereafter, centrifugal filtration using a centrifuge was performed to remove impurities such as coarse particles or dust. A concentration of the white pigment was adjusted to 20% by mass and to obtain the white pigment dispersion. A particle diameter of the white pigment was 350 nm in average particle diameter.

Preparation of Non-White Coloring Material Dispersion

First, 9 parts by mass of an acrylic acid-acrylic acid ester copolymer (weight average molecular weight:25,000, acid value: 180) as a resin dispersant were added to and dissolved in 160.5 parts by mass of ion-exchanged water in which 2 parts by mass of 30% aqueous ammonia solution (neutralizing agent) was dissolved. 30 Parts by mass of C.I. pigment blue 15:3 as a cyan pigment was added thereto, and dispersion treatment was performed for 10 hours in a ball mill using zirconia beads. Thereafter, centrifugal filtration using a centrifuge was performed to remove impurities such as coarse particles or dust. A concentration of the cyan pigment was adjusted to 15% by mass and to obtain the non-white coloring material (cyan pigment) dispersion. In this case, a particle diameter of the cyan pigment was 100 nm in average particle diameter. The pigment was used by forming a pigment dispersion, in which a cyan pigment was dispersed in water using 30% by mass of a resin dispersant, in advance.

Preparation of Resin Particle Emulsion

Two kinds of resin particle emulsions (styrene acrylic resin emulsion A and styrene acrylic resin emulsion B) were prepared. Each resin particle emulsion was an emulsion having a solid content of 40% by mass. In the resin particles, a kind and a composition ratio of an acrylic monomer at the time of resin polymerization were adjusted. Thus, resin having high reactivity was obtained mainly by making an acid value of whole resin relatively high, and resin having low reactivity was obtained by making the acid value relatively low. The ink was adjusted using a resin or the like, and mixed with treatment liquid to confirm the thickening ratio.

of the recording medium using a fan. For the blowing, warm air or normal temperature air was used so as to reach the surface temperature of the recording medium in Tables 3 to 5. The air velocity immediately above the recording medium was set to 2.0 m/s.

In the radiation type, radiation was performed by an infrared radiation mechanism, and the IR heater irradiated the recording medium from above. In the conductive type, heating was performed by the platen heater. In an example used in combination, the surface temperature of the recording medium was controlled to reach a value in Tables 3 to 5. A surface temperature of the recording medium is the highest temperature in the step. Also, a top portion of the

TABLE 1

| | | Treatment liquid | | | | White ink | | | | Non-white ink |
|---|---|---|---|---|---|---|---|---|---|---|
| | | R1 | R2 | R3 | R4 | W1 | W2 | W3 | W4 | C1 |
| Aggregating agent | Magnesium sulfate heptahydrate | 7.0 | — | — | — | — | — | — | — | — |
| | Calcium acetate | — | 7.0 | — | — | — | — | — | — | — |
| | Cationic polymer | — | — | 4.0 | — | — | — | — | — | — |
| | Malonic acid | — | — | — | 7.0 | — | — | — | — | — |
| Pigment | Titanium dioxide | — | — | — | — | 10.0 | 10.0 | 10.0 | 10.0 | — |
| | Carbon black | — | — | — | — | — | — | — | — | 2.0 |
| Resin particles | Styrene acrylic A | — | — | — | — | 3.0 | — | 3.0 | 3.0 | 4.0 |
| | Styrene acrylic B | — | — | — | — | 5.0 | 8.0 | 5.0 | 5.0 | — |
| Wax | Polyethylene based | — | — | — | — | 1.0 | 1.0 | 1.0 | 1.0 | 1.0 |
| Surfactant | Silicone based | 1.0 | 1.0 | 1.0 | 1.0 | 1.0 | 1.0 | 1.0 | 1.0 | 1.0 |
| Organic solvent | 2-Pyrollidone | 30.0 | 30.0 | 30.0 | 30.0 | 20.0 | 20.0 | 10.0 | 20.0 | 25.0 |
| | 2-methyl-1,3-propanediol | 2.0 | 2.0 | 2.0 | 2.0 | 2.0 | 2.0 | 2.0 | — | 2.0 |
| | Glycerin | — | — | — | — | — | — | — | 2.0 | — |
| | 3-methyl-1,5-pentanediol | 2.0 | 2.0 | 2.0 | 2.0 | 2.0 | 2.0 | 2.0 | 2.0 | 2.0 |
| Water | Pure water | Remainder | Remainder | Remainder | Remainder | Remainder | Remainder | Remainder | Remainder | Remainder |
| | Total | 100 | 100 | 100 | 100 | 100 | 100 | 100 | 100 | 100 |

The materials in Table 1 are as follows.
Aggregating agent: Cationic polymer "Catiomaster PD-7, polyamine resin (epichlorohydrin-amine derivative resin)" manufactured by Yokkaichi Chemical Co., Ltd.
Resin particles: Styrene acrylic resin A: Prepared to be Tg=70.0° C.
Resin particles: Styrene acrylic resin B: Prepared to be Tg=90.0° C.
Wax: Polyethylene-based "AQUACER 539" manufactured by BYK Surfactant: Silicone-based "BYK 349" manufactured by BYK Commercially available titanium dioxide was used as the white pigment, and commercially available carbon black was used as the non-white coloring material.

The thickening ratio of each composition was described in Tables 3 to 5. The ink and the treatment liquid used in the ink jet recording method in each Example were mixed and stirred in a mass ratio of Ink:Treatment liquid=10:1 to determine a ratio of viscosity of a mixed liquid after mixing to viscosity of the ink before mixing, and this ratio was used as the thickening ratio. The viscosity was measured at 20° C.

10.2. Evaluation Method 10.2.1. Recording Test

An ink jet printer "SC-S40650" (manufactured by SEIKO EPSON CORPORATION) was modified and a drying mechanism was provided thereto. Examples of the drying step during the adhesion step included a blowing type, a radiation type, and a conductive type. In each example, the used type was described as "Y" in Tables 3 to 5.

The drying mechanism was provided as shown in FIG. 1. In the blowing type, blowing was performed toward upside platen was formed of metal or plastic in each example. As the metal, stainless steel was used, and as the plastic, ABS resin was used. The platen material used in each example was described as "Y" in Tables 3 to 5.

As the ink jet head, an ink jet head including a nozzle array as shown in FIG. 4 was used. However, the treatment liquid nozzle array 15a, the white ink nozzle array 15b, and the non-white ink nozzle array 15c were filled with respective inks or the like and used. In addition, each nozzle array was divided into three parts of a part a, a part b, and a part c equally from upstream to downstream in the sub-scanning direction. Each part of one nozzle array was divided such that positions do not overlap each other in the sub-scanning direction. For each ink, as described in Table 2, any part of the three parts was used for recording as the discharge nozzle group. Accordingly, a length of one discharge nozzle group is ⅓ of the nozzle array, and is shorter than the discharge nozzle group of FIG. 4. A length of the one nozzle array was set to 1 inch.

TABLE 2

| | Treatment liquid | Non-white ink | White ink |
|---|---|---|---|
| Method (1) | — | Part b | Part c |
| Method (2) | Part a | Part b | Part c |
| Method (3) | Part a, Part b | Part b | Part c |
| Method (4) | — | Part b | Part c |
| Method (5) | — | Part c | Part b |
| Method (6) | Part a | Part c | Part b |
| Method (7) | Part a, Part b | Part c | Part b |
| Method (8) | — | Part c | Part b |

TABLE 2-continued

| | Treatment liquid | Non-white ink | White ink |
|---|---|---|---|
| Method (9) | — | — | Part b, Part c |
| Method (10) | — | Part b, Part c | — |
| Method (11) | Part a | — | Part b, Part c |
| Method (12) | Part a | Part b, Part c | — |

The recording was performed by alternately repeating the main scanning and the sub-scanning by using the discharge nozzle group. Accordingly, the ink or the like with which filling was performed adhered to an area of the recording medium in order of the part a, the part b, and the part c of the discharge nozzle group. Recording was performed in 8 passes for each discharge nozzle group.

Figure 9:
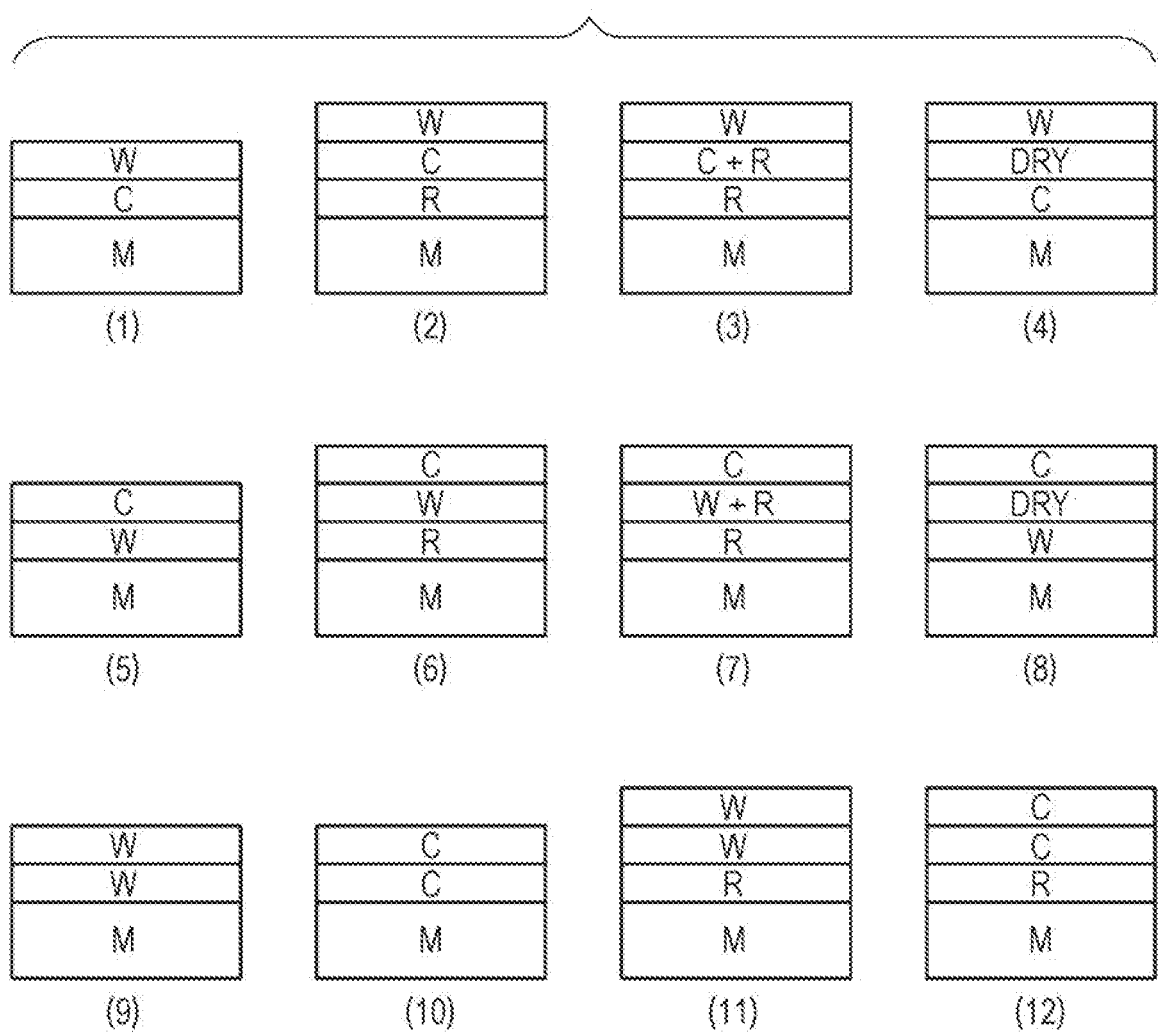
FIG. 9 is a schematic view of a list of recording methods according to Examples.

As the recording method, Methods (1) to (12) in which the layer configurations shown in FIG. 9 were obtained were performed, and the methods used in the respective examples were described in Tables 3 to 5. In FIG. 9, "M" the recording medium, and "W", "C", and "R" represent the white ink, the non-white ink, and the treatment liquid, respectively. Also, although each configuration was drawn with thickness for explanation in FIG. 9, it is not related to an actual thickness. FIG. 9 represents procedure of adhesion to the recording medium (an order from the side close to the recording medium to the side far therefrom). In addition, "C+R" in Method (3) indicates that the non-white ink and the treatment liquid were simultaneously ejected (caused to adhere in one pass), and "W+R" in Method (7) indicates that the white ink and the treatment liquid were simultaneously ejected.

The adhesion amount of the white ink in each example was described in Tables 3 to 5. The adhesion amount of the non-white ink was 15 mg/inch$^2$. However, in Methods (10) and (12), the adhesion amount of the non-white ink was 30 mg/inch$^2$. Also, the adhesion amount of the treatment liquid was set to be 10% by mass, relative to the adhesion amount of the ink total amount. In Methods (3) and (7), the adhesion amounts of the treatment liquid adhering first and the treatment liquid adhering by simultaneous ejecting with the ink were equalized in half. Also, in each example, adhesion of the treatment liquid, the white ink, and the non-white ink was all performed by eight passes. However, in each Reference Example, adhesion of the ink or the treatment liquid alone was performed by 16 passes in total.

The number of times that main scanning was performed on the suction hole in each example was described in Tables 3 to 5. The number of times is the number of times of the main scanning in adhesion of ink for the first layer, and is not counted for the second layer. In the recording test, the number of times was adjusted to be 0 to 3, by changing the number of the suction holes arranged in the sub-scanning direction by partially covering the suction holes or the like. In each Reference Example, the number of times was 16 passes in the ink alone, but the number of the main scanning on the suction holes in the first 8 passes was taken. In Reference Example 5, a platen having no suction hole was mounted on the apparatus and used.

Inter-pass time was adjusted, and the time from the end of the previous ink adhesion to the start of the subsequent ink adhesion was adjusted to be the time in Tables 3 to 5 for each example. The time is, regarding one area of the recording medium, from the time when the nozzle array in the final pass of the ink adhering first is positioned at the center in a paper width direction to the time when the nozzle array in the first pass of the ink adhering later is positioned at the center in the paper width direction. "DRY" in Methods (4) and (8) indicates that the inter-pass time is made longer and left for a long time as compared to another system.

Also, as a heater used for post-heating (secondary heating), an infrared radiation mechanism was provided downstream of the recording medium in the transport direction and used. A post-heating temperature and time were 80.0° C. and 60.0 seconds.

As the recording medium, a clear PET medium E1000ZC (manufactured by Lintec Corporation) was used. The recording head was filled with the treatment liquid, the white ink, and the non-white ink. Each of the treatment liquid and the ink was superimposed in a test pattern and recorded on the recording medium in the order shown in the recording method. A dot density was adjusted such that the coating amount (adhesion amount) in Tables 2 to 5 was obtained as a basic resolution of 1440×1400 dpi for each treatment liquid and ink.

10.2.2. Evaluation Method 10.2.2.1. Evaluation of Suction Hole Mark

An evaluation was performed by observing the recorded matter obtained in each example with visual observation from the recording surface side of the recording medium. The evaluation was performed according to the following evaluation criteria, and results thereof were described in Tables 3 to 5.

A: When confirmed with transmitted light through fluorescent light, a suction hole mark cannot be seen.

B: When confirmed with transmitted light through fluorescent light, a suction hole mark is visible, but when confirmed with reflected light of the fluorescent light, a suction hole mark cannot be seen.

C: With transmitted light and reflected light of the fluorescent light, a suction hole mark can be seen.

10.2.2.2. Evaluation of Layered Image Quality

An evaluation was performed by observing the recorded matter obtained in each example with visual observation and using a loupe from the recording surface side of the recording medium. The evaluation was performed according to the following evaluation criteria, and results thereof were described in Tables 3 to 5. In Reference Examples 1 to 4, the evaluation was not performed.

A: There is no bleeding in an image. Bleeding is not visible visually and by using the loupe.

B: Bleeding is not visible visually but visible using a loupe.

C: Small bleeding can be seen visually.

D: Large bleeding can be seen visually.

10.2.2.3. Evaluation of Scratch Resistance

The scratch resistance of the recorded matter obtained in each example was evaluated using a Color Fastness Rubbing Tester AB-301 (trade name, manufactured by Tester Sangyo Co., Ltd.). Specifically, the surface of the recording medium on which the image was recorded was rubbed back and forth 10 times under a load of 500 g with a friction element attached with a white cotton cloth (in accordance with JIS L 0803). Thus, a peeling state of the image (coating film) on the surface of the recording medium was visually observed, the evaluation was performed according to the following criteria, and results were described in Tables 3 to 5.

A: There is no peeling of the coating film.

B: Although the peeling of a coating film occurs, peeling occurred in an area within 10% with respect to the evaluation area.

C: The peeling of the coating film occurred in an area exceeding 10% of an evaluation area.

10.2.2.4. Evaluation of Discharge Stability

The image recording was continuously performed for hour under the condition of image formation, and the nozzle array of the discharge ink groups of the white ink and non-white ink after recording were inspected, and evaluated with the following criteria. Results thereof were described in Tables 3 to 5. An evaluation was taken as an average value of the nozzles of the white ink and the non-white ink.

A: There is no nozzle failure.
B: Nozzle failure is 2% or less.
C: Nozzle failure is more than 2% and 4% or less.
D: Nozzle failure exceeds 4%.

TABLE 3

| | | Examples | | | | | | |
|---|---|---|---|---|---|---|---|---|
| | | 1 | 2 | 3 | 4 | 5 | 6 | 7 |
| Recording method | | Method 1 | Method 1 | Method 1 | Method 1 | Method 1 | Method 2 | Method 2 |
| Drying method | Blowing | Y | Y | Y | Y | Y | Y | Y |
| | Radiation | — | — | — | — | — | — | — |
| | Conduction | — | — | — | — | — | — | — |
| Temperature of recording medium (° C.) | | 45.0 | 45.0 | 45.0 | 45.0 | 40.0 | 35.0 | 40.0 |
| Time from end of previous ink adhesion step to start of subsequent ink adhesion step (sec) | | 5.0 | 5.0 | 5.0 | 5.0 | 5.0 | 5.0 | 5.0 |
| Platen material | Plastic | Y | — | — | — | — | Y | Y |
| | Metal | — | Y | Y | Y | Y | — | — |
| White ink | | W1 | W1 | W3 | W1 | W1 | W1 | W1 |
| Non-white ink | | C1 | C1 | C1 | C1 | C1 | C1 | C1 |
| Treatment liquid | | — | — | — | — | — | R1 | R1 |
| Thickening ratio obtained by mixing with treatment liquid | White ink | — | — | — | — | — | 1.5 | 1.5 |
| | Non-white ink | — | — | — | — | — | 3.5 | 3.5 |
| Adhesion amount of white ink (mg/inch$^2$) | | 15.0 | 15.0 | 15.0 | 7.0 | 15.0 | 15.0 | 15.0 |
| Number of times of main scanning on suction hole | | 2 | 2 | 2 | 2 | 2 | 2 | 2 |
| Image quality | Suction hole mark | A | B | A | A | A | A | B |
| | Bleeding | B | B | B | A | B | B | A |
| Durability | Scratch resistance | A | A | B | B | A | B | B |
| | Discharge stability | C | C | B | C | B | A | B |

| | | Examples | | | | | |
|---|---|---|---|---|---|---|---|
| | | 8 | 9 | 10 | 11 | 12 | 13 |
| Recording method | | Method 2 | Method 2 | Method 2 | Method 2 | Method 2 | Method 2 |
| Drying method | Blowing | Y | Y | Y | Y | Y | — |
| | Radiation | — | — | — | — | — | Y |
| | Conduction | — | — | — | — | — | — |
| Temperature of recording medium (° C.) | | 35.0 | 35.0 | 35.0 | 35.0 | 35.0 | 35.0 |
| Time from end of previous ink adhesion step to start of subsequent ink adhesion step (sec) | | 5.0 | 5.0 | 5.0 | 5.0 | 5.0 | 5.0 |
| Platen material | Plastic | — | — | — | — | — | Y |
| | Metal | Y | Y | Y | Y | Y | — |
| White ink | | W1 | W1 | W1 | W1 | W1 | W1 |
| Non-white ink | | C1 | C1 | C1 | C1 | C1 | C1 |
| Treatment liquid | | R1 | R3 | R2 | R4 | R1 | R1 |
| Thickening ratio obtained by mixing with treatment liquid | White ink | 1.5 | 2 | 2 | 1.5 | 1.5 | 1.5 |
| | Non-white ink | 3.5 | 4.5 | 4.5 | 3.5 | 3.5 | 3.5 |
| Adhesion amount of white ink (mg/inch$^2$) | | 15.0 | 15.0 | 15.0 | 15.0 | 15.0 | 15.0 |
| Number of times of main scanning on suction hole | | 2 | 2 | 2 | 2 | 3 | 2 |
| Image quality | Suction hole mark | A | A | A | B | B | B |
| | Bleeding | A | B | A | B | B | B |
| Durability | Scratch resistance | B | A | B | B | B | B |
| | Discharge stability | A | A | A | A | A | A |

TABLE 4

| | | Examples | | | | | | |
|---|---|---|---|---|---|---|---|---|
| | | 14 | 15 | 16 | 17 | 18 | 19 | 20 |
| Recording method | | Method 3 | Method 3 | Method 3 | Method 3 | Method 4 | Method 4 | Method 4 |
| Drying method | Blowing | Y | Y | Y | Y | Y | Y | Y |
| | Radiation | — | — | — | — | — | — | — |
| | Conduction | — | — | — | — | — | — | Y |

TABLE 4-continued

|  |  |  |  |  |  |  |  |  |
|---|---|---|---|---|---|---|---|---|
| Temperature of recording medium (° C.) | | 35.0 | 35.0 | 35.0 | 35.0 | 35.0 | 35.0 | 35.0 |
| Time from end of previous ink adhesion step to start of subsequent ink adhesion step (sec) | | 5.0 | 5.0 | 5.0 | 5.0 | 15.0 | 15.0 | 15.0 |
| Platen material | Plastic | Y | — | — | — | Y | — | Y |
| | Metal | — | Y | Y | Y | — | Y | — |
| | White ink | W1 | W1 | W2 | W1 | W1 | W1 | W1 |
| | Non-white ink | C1 | C1 | C1 | C1 | C1 | C1 | C1 |
| | Treatment liquid | R1 | R1 | R1 | — | — | — | — |
| Thickening ratio obtained by mixing with treatment liquid | White ink | 1.5 | 1.5 | 1.1 | — | — | — | — |
| | Non-white ink | 3.5 | 3.5 | 3.5 | — | — | — | — |
| Adhesion amount of white ink (mg/inch$^2$) | | 15.0 | 15.0 | 15.0 | 15.0 | 15.0 | 15.0 | 15.0 |
| Number of times of main scanning on suction hole | | 2 | 2 | 2 | 2 | 2 | 2 | 2 |
| Image quality | Suction hole mark | A | A | B | B | A | B | B |
| | Bleeding | A | A | B | B | B | A | A |
| Durability | Scratch resistance | B | B | B | A | A | A | A |
| | Discharge stability | A | A | A | A | A | A | A |

|  |  | Examples | | | | | |
|---|---|---|---|---|---|---|---|
|  |  | 21 | 22 | 23 | 24 | 25 | 26 |
| Recording method | | Method 4 | Method 4 | Method 4 | Method 5 | Method 6 | Method 6 |
| Drying method | Blowing | Y | Y | Y | Y | Y | Y |
| | Radiation | — | — | — | — | — | — |
| | Conduction | — | — | — | — | — | — |
| Temperature of recording medium (° C.) | | 35.0 | 35.0 | 25.0 | 45.0 | 35.0 | 40.0 |
| Time from end of previous ink adhesion step to start of subsequent ink adhesion step (sec) | | 15.0 | 15.0 | 30.0 | 5.0 | 5.0 | 5.0 |
| Platen material | Plastic | — | — | — | — | — | Y |
| | Metal | Y | Y | Y | Y | Y | — |
| | White ink | W1 | W4 | W1 | W1 | W1 | W1 |
| | Non-white ink | C1 | C1 | C1 | C1 | C1 | C1 |
| | Treatment liquid | — | — | — | — | R1 | R1 |
| Thickening ratio obtained by mixing with treatment liquid | White ink | — | — | — | — | 1.5 | 1.5 |
| | Non-white ink | — | — | — | — | 3.5 | 3.5 |
| Adhesion amount of white ink (mg/inch$^2$) | | 15.0 | 15.0 | 15.0 | 15.0 | 15.0 | 15.0 |
| Number of times of main scanning on suction hole | | 1 | 1 | 2 | 2 | 2 | 2 |
| Image quality | Suction hole mark | A | B | A | B | A | A |
| | Bleeding | A | B | B | B | B | A |
| Durability | Scratch resistance | A | A | A | A | B | B |
| | Discharge stability | A | A | A | C | A | B |

TABLE 5

|  |  | Examples | | | | Comparative Examples | | | |
|---|---|---|---|---|---|---|---|---|---|
|  |  | 27 | 28 | 29 | 30 | 1 | 2 | 3 | 4 |
| Recording method | | Method 7 | Method 8 | Method 8 | Method 8 | Method 1 | Method 2 | Method 3 | Method 1 |
| Drying method | Blowing | Y | Y | Y | Y | — | — | — | — |
| | Radiation | — | — | — | — | — | — | — | — |
| | Conduction | — | — | Y | — | Y | Y | Y | — |
| Temperature of recording medium (° C.) | | 35.0 | 35.0 | 35.0 | 25.0 | 45.0 | 35.0 | 35.0 | 25.0 |
| Time from end of previous ink adhesion step to start of subsequent ink adhesion step (sec) | | 5.0 | 15.0 | 15.0 | 30.0 | 5.0 | 5.0 | 5.0 | 5.0 |
| Platen material | Plastic | — | — | — | — | — | — | — | — |
| | Metal | Y | Y | Y | Y | Y | Y | Y | Y |
| | White ink | W1 | W1 | W1 | W1 | W1 | W1 | W1 | W1 |
| | Non-white ink | C1 | C1 | C1 | C1 | C1 | C1 | C1 | C1 |
| | Treatment liquid | R1 | — | — | — | — | R1 | R1 | — |
| Thickening ratio obtained by mixing with treatment liquid | White ink | 1.5 | — | — | — | — | 1.5 | 1.5 | — |
| | Non-white ink | 3.5 | — | — | — | — | 3.5 | 3.5 | — |
| Adhesion amount of white ink (mg/inch$^2$) | | 15.0 | 15.0 | 15.0 | 15.0 | 15.0 | 15.0 | 15.0 | 15.0 |
| Number of times of main scanning on suction hole | | 2 | 2 | 2 | 2 | 2 | 2 | 2 | 2 |
| Image quality | Suction hole mark | A | B | B | A | C | C | C | A |
| | Bleeding | A | A | A | B | B | B | A | D |

TABLE 5-continued

| Durability | Scratch resistance | B | A | A | A | A | B | B | B |
|---|---|---|---|---|---|---|---|---|---|
| | Discharge stability | A | A | A | A | C | A | A | A |

| | | | Reference Examples | | | | |
|---|---|---|---|---|---|---|---|
| | | | 1 | 2 | 3 | 4 | 5 |
| | Recording method | | Method 9 | Method 10 | Method 11 | Method 12 | Method 2 |
| Drying method | Blowing | | — | — | — | — | — |
| | Radiation | | — | — | — | — | — |
| | Conduction | | Y | Y | Y | Y | Y |
| Temperature of recording medium (° C.) | | | 45.0 | 45.0 | 35.0 | 35.0 | 35.0 |
| Time from end of previous ink adhesion step to start of subsequent ink adhesion step (sec) | | | 5.0 | 5.0 | 5.0 | 5.0 | 5.0 |
| Platen material | Plastic | | — | — | — | — | — |
| | Metal | | Y | Y | Y | Y | Y |
| | White ink | | W1 | — | W1 | — | W1 |
| | Non-white ink | | — | C1 | — | C1 | C1 |
| | Treatment liquid | | — | — | R1 | R1 | R1 |
| Thickening ratio obtained by mixing with treatment liquid | White ink | | — | — | 1.5 | 1.5 | 1.5 |
| | Non-white ink | | — | — | 3.5 | 3.5 | 3.5 |
| Adhesion amount of white ink (mg/inch$^2$) | | | 30.0 | — | 30.0 | — | 15.0 |
| Number of times of main scanning on suction hole | | | 2 | 2 | 2 | 2 | 0 |
| Image quality | Suction hole mark | | A | A | A | A | A |
| | Bleeding | | — | — | — | — | B |
| Durability | Scratch resistance | | A | A | B | B | B |
| | Discharge stability | | C | C | A | A | A |

10.3. Evaluation Results

From Example, Comparative Examples, and Reference Examples, the following was found.

In each of the examples having the white ink adhesion step, the non-white ink adhesion step, and drying step of drying by a blowing type or a radiation type drying unit, the evaluation results of the suction hole mark and the bleed are all good.

On the other hand, in Comparative Examples which are not as above, evaluation of any of the suction hole mark and the bleeding was all poor. The details will be described below.

From comparison between Examples 18 and 19, when the material of the platen was the plastic, it was more excellent in the reduction of the suction hole mark, compared to the metal. On the other hand, when the material of the platen was the metal, it was more excellent in the bleeding reduction, compared to the plastic.

From comparison between Examples 6 and 13, when the blowing type is used as the drying method, it was more excellent in the reduction of the suction hole mark or the bleeding reduction, compared to the radiation type.

From the comparison between Examples 6 and 7 and comparison between Examples 2 and 5, it was found that the lower the temperature of the recording medium during the adhesion step, the more excellent the reduction of the suction hole mark, and the higher the temperature, the more excellent the bleeding reduction.

From Example 23, even when the recording medium was dried at a normal temperature by drying with the normal temperature air, excellent reduction of the suction hole mark and the bleeding reduction were obtained, but it was necessary to extend a time interval. From this, it was found that when the recording medium was dried at a temperature higher than the normal temperature, it was preferable in that drying can be performed in a short time.

From the comparison between Examples 8 and 12 or the comparison between Examples 19 and 21, it was found that the smaller the number of times the main scanning on the suction hole was performed, the more excellent the reduction of the suction hole mark.

From Example 20, it was found that even when the conductive method was further used in combination for the drying step, excellent reduction of the suction hole mark and bleeding reduction were obtained. In addition, when comparing Examples 20 and 18, in a case of using the blow and conduction in combination, the bleeding reduction was more excellent.

From the comparison between Examples 2 and 4, when the adhesion amount of the white ink was small, the reduction of the suction hole mark was more excellent, but when the adhesion amount was large, it was preferable in that recording of a white image with high density could be performed. From this, it was found that, according to the present disclosure, it was useful in that even when the adhesion amount of the white ink is increased to obtain the white image with high density, the reduction of the suction hole mark could be obtained.

From comparison between Examples 15 and 17, it was found that when using the treatment liquid, the reduction of the suction hole mark or bleeding reduction was more excellent.

From the comparison of Examples 7 and 26, it was found that when the thickening ratio of the ink adhering later among the white ink and the non-white ink, obtained by mixing with the treatment liquid, was higher than that of the ink adhering first, the reduction of the suction hole mark was more excellent.

From Examples 9 to 11, when the aggregating agent contained in the treatment liquid is a multivalent metal salt, the reduction of the suction hole mark or the bleeding reduction was more excellent, and also when the aggregating agent was a cationic polymer, the reduction of the suction hole mark or the scratch resistance was more excellent.

From the comparison between Examples 21 and 22, when the smaller the content of the high boiling point solvent of the ink, the more excellent the reduction of the suction hole mark, the bleeding reduction, or the scratch resistance. Although not described in the tables, the non-white ink had the same tendency.

From the comparison between Examples 2 and 3, when the smaller the content of the nitrogen-containing solvent contained in the ink, the more excellent the reduction of the suction hole mark, and the more the content, the more excellent the scratch resistance. Although not described in the tables, the non-white ink had the same tendency.

From comparison between Examples 15 and 16, it was found that when the thickening ratio of the ink, obtained by mixing the treatment liquid was high, the reduction of the suction hole mark or bleeding reduction was more excellent.

On the other hand, in Comparative Examples 1 to 3 in which neither the blowing type drying unit nor the radiation type drying unit was used, the evaluation of the suction hole mark was poor. In addition, in Comparative Example 4 in which the drying step was not performed, the evaluation of the bleeding was poor.

Moreover, in Reference Example 5 in which the platen having no suction hole was used, although neither the blowing type drying unit nor the radiation type drying unit was used, although the evaluation results of the suction hole mark and the bleeding were good, floating in the recording medium occurred and the transport was unstable.

In Reference Examples 1 to 4, although neither the blowing type drying unit nor the radiation type drying unit was used, the reduction of the suction hole mark was favorable. From this, it was found that when the recording was performed using the white ink and the non-white ink, the suction hole mark occurred.

The present disclosure is not limited to the embodiments described above, and various modifications can be made. For example, the present disclosure includes substantially the same configurations as the configurations described in the embodiments (for example, configurations having the same functions, methods, and results, or configurations having the same purpose and effect). In addition, the present disclosure includes a configuration in which a non-essential component of the configuration described in the embodiment is replaced. In addition, the present disclosure includes a configuration exhibiting the same operational effect as the configuration described in the embodiment, or a configuration capable of achieving the same object. Also, the present disclosure includes configurations in which well-known techniques are added to the configuration described in the embodiment.

What is claimed is:

1. An ink jet recording method comprising:
    a white ink adhesion step of causing a white ink containing a white pigment to adhere to a recording medium by an ink jet method;
    a non-white ink adhesion step of causing a non-white ink containing a non-white coloring material to adhere to the recording medium by the ink jet method; and
    a drying step of drying the white ink and the non-white ink adhering to the recording medium in the white ink adhesion step and the non-white ink adhesion step by a blowing type or radiation type drying unit, wherein
    the white ink adhesion step and the non-white ink adhesion step are performed in a state where the recording medium is supported on a support member including a suction hole sucking the recording medium, and are performed by plural times of main scanning in which a recording head discharging the white ink and a recording head discharging the non-white ink discharge each ink while moving in a main scanning direction and plural times of sub-scanning in which the recording medium moves in a sub-scanning direction intersecting the main scanning direction.

2. The ink jet recording method according to claim 1, wherein
    a surface temperature of the recording medium in the white ink adhesion step and the non-white ink adhesion step is 40.0° C. or lower.

3. The ink jet recording method according to claim 1, wherein
    in the step performed first among the white ink adhesion step and the non-white ink adhesion step, the number of times of the main scanning which is performed in a state where an area of the recording medium is supported on the suction hole is 10 or less.

4. The ink jet recording method according to claim 1, wherein
    the support member includes a conductive type drying unit heating the recording medium conductively, and
    the ink jet recording method further comprises a drying step of drying the white ink and the non-white ink adhering to the recording medium in the white ink adhesion step and the non-white adhesion step, by the conductive type drying drying unit.

5. The ink jet recording method according to claim 1, wherein
    a material of the support member is metal or plastic.

6. The ink jet recording method according to claim 1, further comprising:
    a treatment liquid adhesion step of causing a treatment liquid containing an aggregating agent to adhere to the recording medium.

7. The ink jet recording method according to claim 6, wherein
    a thickening ratio of the ink adhering in the step performed later among the white ink adhesion step and the non-white ink adhesion step is greater than a thickening ratio of the ink adhering in the step performed first.

8. The ink jet recording method according to claim 1, wherein
    the white ink adhesion step is performed prior to the non-white ink adhesion step.

9. The ink jet recording method according to claim 1, wherein
    the recording head includes a first nozzle array and a second nozzle array each of which nozzles are arranged in the sub-scanning direction,
    the first nozzle array and the second nozzle array are disposed to overlap each other when projected in the main scanning direction,
    each of the first nozzle array and the second nozzle array has a discharge nozzle group and a non-discharge nozzle group,
    when the discharge nozzle group of the first nozzle array and the discharge nozzle group of the second nozzle array are projected in the main scanning direction, the discharge nozzle group of the first nozzle array is disposed upstream of the discharge nozzle group of the second nozzle array in a transport direction of the recording medium in the sub-scanning direction, the ink adhering in the step performed first among the white ink adhesion step and the non-white ink adhesion step is discharged from the discharge nozzle group of the first nozzle array, and the ink adhering in the step performed later among the white ink adhesion step and the non-white ink adhesion step is discharged from the discharge nozzle group of the second nozzle array.

10. The ink jet recording method according to claim 1, wherein an adhesion amount of the white ink in the white ink adhesion step is 5.0 mg/inch$^2$ or more.

11. The ink jet recording method according to claim 1, wherein the recording is performed on a low-absorbent recording medium or a non-absorbent recording medium.

12. The ink jet recording method according to claim 1, wherein in the ink adhering in the step performed later among the white ink adhesion step and the non-white ink adhesion step, a content of an organic solvent of polyols, having a normal boiling point of 280.0° C. or higher is 1.0% by mass or less relative to an ink total amount.

13. The ink jet recording method according to claim 1, wherein a white ink layer formed by the white ink adhesion step and a non-white ink layer formed by the non-white ink adhesion step are stacked on the recording medium.

* * * * *